US008355745B2

(12) United States Patent
Okabe

(10) Patent No.: US 8,355,745 B2
(45) Date of Patent: Jan. 15, 2013

(54) COEFFICIENT DECISION APPARATUS, RADIO COMMUNICATION SYSTEM, COEFFICIENT DECISION METHOD, AND MEMORY MEDIUM

(75) Inventor: Yoshihide Okabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1037 days.

(21) Appl. No.: 12/251,704

(22) Filed: Oct. 15, 2008

(65) Prior Publication Data

US 2009/0098900 A1    Apr. 16, 2009

(30) Foreign Application Priority Data

Oct. 15, 2007  (JP) .................................. 2007-268007

(51) Int. Cl.
*H04B 7/00*  (2006.01)
(52) U.S. Cl. ......................................... 455/522; 455/69
(58) Field of Classification Search ................... 455/522
See application file for complete search history.

(56) References Cited

U.S. PATENT DOCUMENTS

| | | | | | |
|---|---|---|---|---|---|
| 4,965,789 | A * | 10/1990 | Bottau et al. | ................... | 370/465 |
| 6,128,506 | A * | 10/2000 | Knutsson et al. | ............. | 455/522 |
| 6,212,360 | B1 * | 4/2001 | Fleming et al. | .............. | 455/13.4 |
| 6,549,785 | B1 * | 4/2003 | Agin | .............................. | 455/522 |
| 6,553,016 | B1 * | 4/2003 | Roxbergh | ...................... | 370/331 |
| 6,553,235 | B2 * | 4/2003 | Bark et al. | ..................... | 455/453 |
| 6,567,670 | B1 * | 5/2003 | Petersson | ...................... | 455/522 |
| 6,628,956 | B2 * | 9/2003 | Bark et al. | ..................... | 455/522 |
| 6,678,257 | B1 * | 1/2004 | Vijayan et al. | ................. | 370/320 |
| 6,717,464 | B2 * | 4/2004 | Fudaba et al. | ................. | 330/149 |
| 6,778,812 | B1 * | 8/2004 | Zhang | ......................... | 455/67.13 |
| 6,920,424 | B2 * | 7/2005 | Padmanabhan | ................ | 704/243 |
| 6,963,553 | B1 * | 11/2005 | Cordier et al. | ................. | 370/342 |
| 7,016,686 | B2 * | 3/2006 | Spaling et al. | ................ | 455/453 |
| 7,050,760 | B2 * | 5/2006 | Itoh | ............................... | 455/67.13 |
| 7,085,581 | B2 * | 8/2006 | Vanghi | .......................... | 455/522 |
| 7,127,006 | B2 * | 10/2006 | Eudes et al. | ................... | 375/298 |
| 7,130,875 | B2 * | 10/2006 | Abe | ................................ | 708/322 |
| 7,167,718 | B2 * | 1/2007 | Hayashi et al. | ................ | 455/522 |
| 7,327,794 | B2 * | 2/2008 | Fanson et al. | .................. | 375/260 |
| 7,483,711 | B2 * | 1/2009 | Burchfiel | ....................... | 455/522 |
| 7,486,726 | B2 * | 2/2009 | Alexander et al. | ............. | 375/232 |
| 7,539,489 | B1 * | 5/2009 | Alexander | ...................... | 455/423 |
| 7,620,004 | B2 * | 11/2009 | Brueck et al. | .................. | 370/317 |
| 7,684,408 | B2 * | 3/2010 | Wakabayashi | .............. | 370/395.4 |
| 7,769,391 | B2 * | 8/2010 | Andersson et al. | ............ | 455/453 |
| 7,822,131 | B2 * | 10/2010 | Chen et al. | ..................... | 375/260 |
| 7,961,616 | B2 * | 6/2011 | Jain et al. | ....................... | 370/235 |
| 8,036,668 | B2 * | 10/2011 | Panico et al. | ................... | 455/446 |

(Continued)

FOREIGN PATENT DOCUMENTS

JP           2002238073 A      8/2002

(Continued)

*Primary Examiner* — Hai Nguyen

(57) ABSTRACT

The present invention provides a radio communication system that can decide efficiently a filter coefficient used when averaging a transmission power value. The radio communication system of the present invention includes an acquisition unit (1) acquiring at least a transmission power value which each base station (105) measured, and a decision unit (2) specifying a congestion transmission power value, at which a congestion arises, among from the transmission power value acquired by the acquisition unit (1), selecting a filter coefficient according to the congestion transmission power value, and deciding the selected filter coefficient as a new filter coefficient, and decides whether the congestion arose, on the basis of an electric power mean value averaged with the new filter coefficient decided by the decision unit (2).

17 Claims, 24 Drawing Sheets

U.S. PATENT DOCUMENTS

| | | | |
|---|---|---|---|
| 8,121,049 B2 * | 2/2012 | Lidstrom et al. | 370/252 |
| 8,190,093 B2 * | 5/2012 | Burchfiel | 455/63.1 |
| 2002/0119796 A1 * | 8/2002 | Vanghi | 455/522 |
| 2003/0012298 A1 * | 1/2003 | Eudes et al. | 375/298 |
| 2003/0054773 A1 * | 3/2003 | Vanghi | 455/70 |
| 2003/0112853 A1 * | 6/2003 | Iwamoto et al. | 375/146 |
| 2003/0128740 A1 * | 7/2003 | Iwamoto et al. | 375/130 |
| 2004/0005001 A1 * | 1/2004 | Jones et al. | 375/232 |
| 2004/0092281 A1 * | 5/2004 | Burchfiel | 455/522 |
| 2004/0264561 A1 * | 12/2004 | Alexander et al. | 375/232 |
| 2005/0002330 A1 * | 1/2005 | Cave et al. | 370/229 |
| 2005/0003824 A1 * | 1/2005 | Siris | 455/452.1 |
| 2005/0213643 A1 * | 9/2005 | Iwamoto et al. | 375/149 |
| 2006/0189334 A1 * | 8/2006 | Wakabayashi | 455/500 |
| 2006/0217074 A1 * | 9/2006 | Wakabayashi | 455/68 |
| 2006/0256756 A1 * | 11/2006 | Wakabayashi | 370/335 |
| 2007/0038396 A1 * | 2/2007 | Zima et al. | 702/65 |
| 2010/0035619 A1 * | 2/2010 | Panico et al. | 455/446 |
| 2010/0087219 A1 * | 4/2010 | Jonsson et al. | 455/522 |
| 2010/0235632 A1 * | 9/2010 | Iyengar et al. | 713/166 |

FOREIGN PATENT DOCUMENTS

| | | |
|---|---|---|
| JP | 2005210189 A | 8/2005 |
| JP | 2006135516 A | 5/2006 |

* cited by examiner

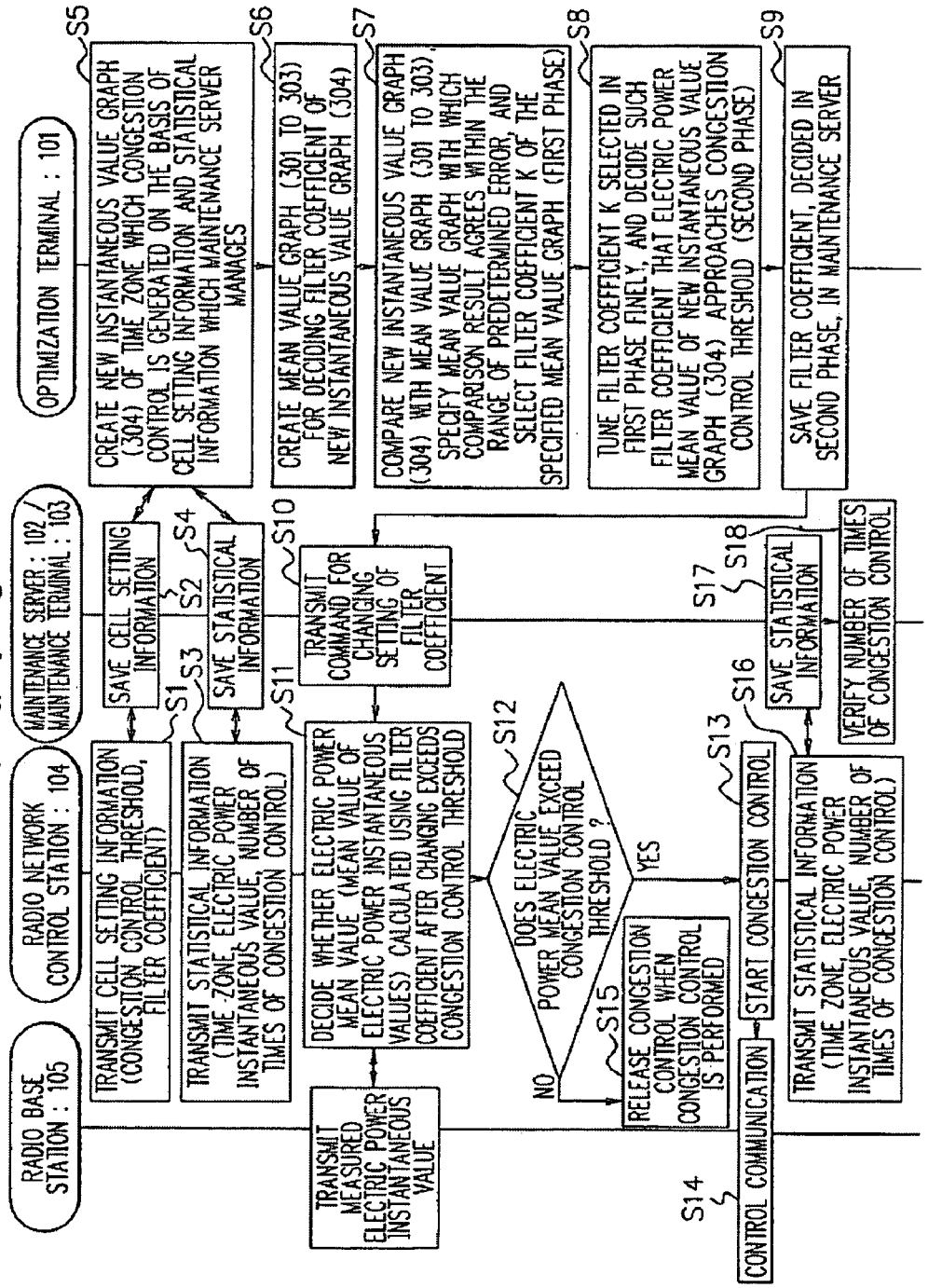

FIG. 4

CELL SETTING INFORMATION MANAGED BY RADIO NETWORK CONTROL STATION 104
(CONGESTION CONTROL THRESHOLD, FILTER COEFFICIENT)

| BASE STATION ID | CELL ID | CONGESTION CONTROL THRESHOLD | FILTER COEFFICIENT |
|---|---|---|---|
| BASE STATION IDa | CELL IDa | CONGESTION CONTROL THRESHOLD a | FILTER COEFFICIENT ka |
| | CELL IDb | CONGESTION CONTROL THRESHOLD b | FILTER COEFFICIENT kb |
| BASE STATION IDb | CELL IDc | CONGESTION CONTROL THRESHOLD c | FILTER COEFFICIENT kc |
| | CELL IDd | CONGESTION CONTROL THRESHOLD d | FILTER COEFFICIENT kd |

FIG. 5

STATISTICAL INFORMATION MANAGED BY RADIO NETWORK CONTROL STATION 104
(TIME ZONE, ELECTRIC POWER INSTANTANEOUS VALUE, NUMBER OF TIMES OF CONGESTION CONTROL)

| BASE STATION ID | CELL ID | TIME ZONE | ELECTRIC POWER INSTANTANEOUS VALUE | NUMBER OF TIMES OF CONGESTION CONTROL |
|---|---|---|---|---|
| BASE STATION IDa | CELL IDa | DATE & TIME 0:00 | ELECTRIC POWER INSTANTANEOUS VALUE a0 | 0 TIMES |
| | | DATE & TIME 1:00 | ELECTRIC POWER INSTANTANEOUS VALUE a1 | 0 TIMES |
| | | ... | ... | ... |
| | | DATE & TIME 12:00 | ELECTRIC POWER INSTANTANEOUS VALUE a12 | 3 TIMES |
| | | ... | ... | ... |
| | CELL IDb | DATE & TIME 0:00 | ELECTRIC POWER INSTANTANEOUS VALUE b0 | 0 TIMES |
| | | DATE & TIME 1:00 | ELECTRIC POWER INSTANTANEOUS VALUE b1 | 1 TIMES |
| | | ... | ... | ... |
| | | DATE & TIME 12:00 | ELECTRIC POWER INSTANTANEOUS VALUE b12 | 3 TIMES |
| BASE STATION IDb | CELL IDc | DATE & TIME 0:00 | ELECTRIC POWER INSTANTANEOUS VALUE c0 | 0 TIMES |
| | | DATE & TIME 1:00 | ELECTRIC POWER INSTANTANEOUS VALUE c1 | 0 TIMES |
| | | ... | ... | ... |
| | | DATE & TIME 12:00 | ELECTRIC POWER INSTANTANEOUS VALUE c12 | 3 TIMES |
| | CELL IDd | DATE & TIME 0:00 | ELECTRIC POWER INSTANTANEOUS VALUE d0 | 0 TIMES |
| | | DATE & TIME 1:00 | ELECTRIC POWER INSTANTANEOUS VALUE d1 | 1 TIMES |
| | | ... | ... | ... |
| | | DATE & TIME 12:00 | ELECTRIC POWER INSTANTANEOUS VALUE d12 | 3 TIMES |

FIG. 6

CELL SETTING INFORMATION MANAGED BY MAINTENANCE SERVER 102
(CONGESTION CONTROL THRESHOLD, FILTER COEFFICIENT)

| CONTROL STATION ID | BASE STATION ID | CELL ID | CONGESTION CONTROL THRESHOLD | FILTER COEFFICIENT |
|---|---|---|---|---|
| CONTROL STATION IDa | BASE STATION IDa | CELL IDa | CONGESTION CONTROL THRESHOLD a | FILTER COEFFICIENT ka |
| | | CELL IDb | CONGESTION CONTROL THRESHOLD b | FILTER COEFFICIENT kb |
| | BASE STATION IDb | CELL IDc | CONGESTION CONTROL THRESHOLD c | FILTER COEFFICIENT kc |
| | | CELL IDd | CONGESTION CONTROL THRESHOLD d | FILTER COEFFICIENT kd |

FIG. 7

STATISTICAL INFORMATION MANAGED BY MAINTENANCE SERVER 102
(TIME ZONE, ELECTRIC POWER INSTANTANEOUS VALUE, NUMBER OF TIMES OF CONGESTION CONTROL)

| CONTROL STATION ID | BASE STATION ID | CELL ID | TIME ZONE | ELECTRIC POWER INSTANTANEOUS VALUE | NUMBER OF TIMES OF CONGESTION CONTROL |
|---|---|---|---|---|---|
| CONTROL STATION IDa | BASE STATION IDa | CELL IDa | DATE & TIME 0:00 | ELECTRIC POWER INSTANTANEOUS VALUE a0 | 0 TIMES |
| | | | DATE & TIME 1:00 | ELECTRIC POWER INSTANTANEOUS VALUE a1 | 0 TIMES |
| | | | ... | ... | ... |
| | | | DATE & TIME 12:00 | ELECTRIC POWER INSTANTANEOUS VALUE a12 | 3 TIMES |
| | | | ... | ... | ... |
| | | CELL IDb | DATE & TIME 0:00 | ELECTRIC POWER INSTANTANEOUS VALUE b0 | 0 TIMES |
| | | | DATE & TIME 1:00 | ELECTRIC POWER INSTANTANEOUS VALUE b1 | 1 TIMES |
| | | | ... | ... | ... |
| | | | DATE & TIME 12:00 | ELECTRIC POWER INSTANTANEOUS VALUE b12 | 3 TIMES |
| | | | ... | ... | ... |
| | BASE STATION IDb | CELL IDc | DATE & TIME 0:00 | ELECTRIC POWER INSTANTANEOUS VALUE c0 | 0 TIMES |
| | | | DATE & TIME 1:00 | ELECTRIC POWER INSTANTANEOUS VALUE c1 | 0 TIMES |
| | | | ... | ... | ... |
| | | | DATE & TIME 12:00 | ELECTRIC POWER INSTANTANEOUS VALUE c12 | 3 TIMES |
| | | CELL IDd | DATE & TIME 0:00 | ELECTRIC POWER INSTANTANEOUS VALUE d0 | 0 TIMES |
| | | | DATE & TIME 1:00 | ELECTRIC POWER INSTANTANEOUS VALUE d1 | 1 TIMES |
| | | | ... | ... | ... |
| | | | DATE & TIME 12:00 | ELECTRIC POWER INSTANTANEOUS VALUE d12 | 3 TIMES |

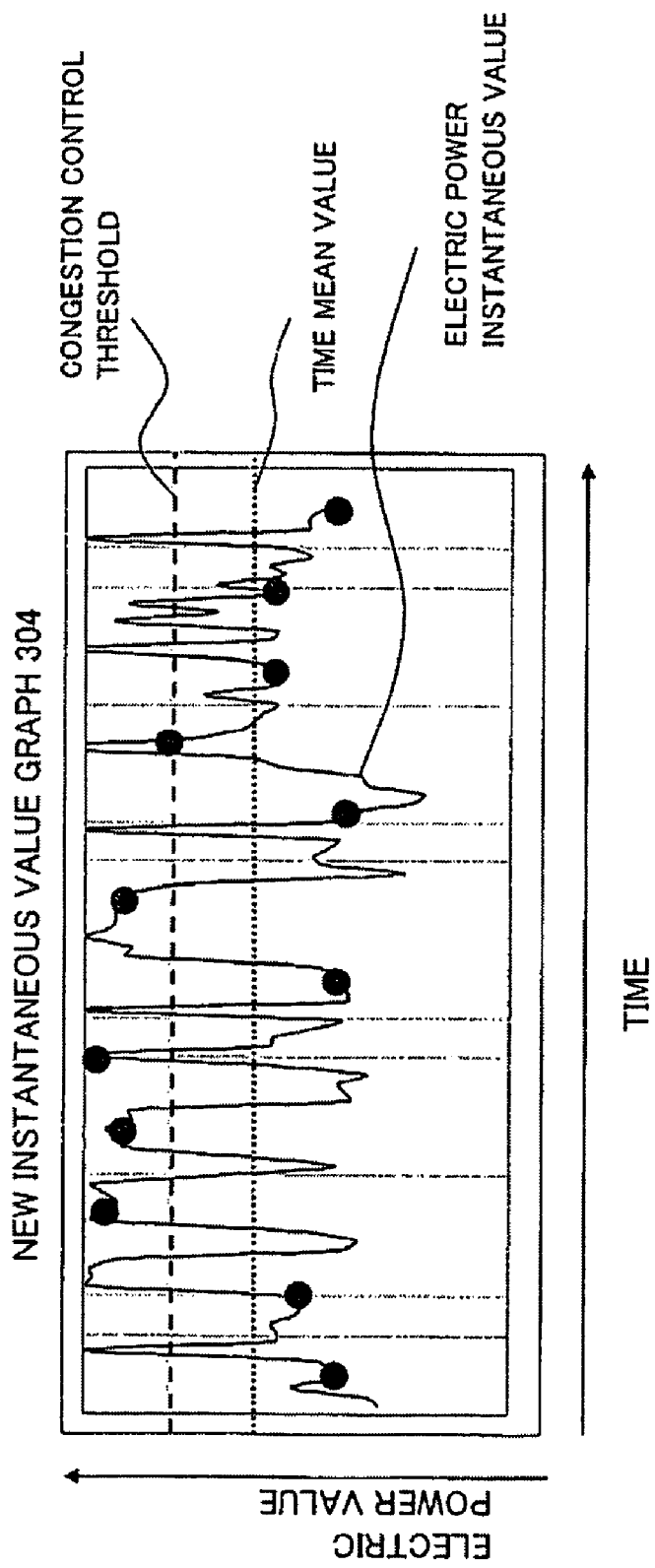

FIG. 9

INFORMATION ON ELECTRIC POWER INSTANTANEOUS VALUE MEASURED BY RADIO BASE STATION 105
(TIME ZONE, ELECTRIC POWER INSTANTANEOUS VALUE)

| CELL ID | TIME ZONE | ELECTRIC POWER INSTANTANEOUS VALUE |
|---|---|---|
| CELL IDa | DATE & TIME 0:00 | ELECTRIC POWER INSTANTANEOUS VALUE a0 |
| | DATE & TIME 1:00 | ELECTRIC POWER INSTANTANEOUS VALUE a1 |
| | ... | ... |
| | DATE & TIME 12:00 | ELECTRIC POWER INSTANTANEOUS VALUE a12 |
| | ... | ... |
| CELL IDb | DATE & TIME 0:00 | ELECTRIC POWER INSTANTANEOUS VALUE b0 |
| | DATE & TIME 1:00 | ELECTRIC POWER INSTANTANEOUS VALUE b1 |
| | ... | ... |
| | DATE & TIME 12:00 | ELECTRIC POWER INSTANTANEOUS VALUE b12 |
| | ... | ... |

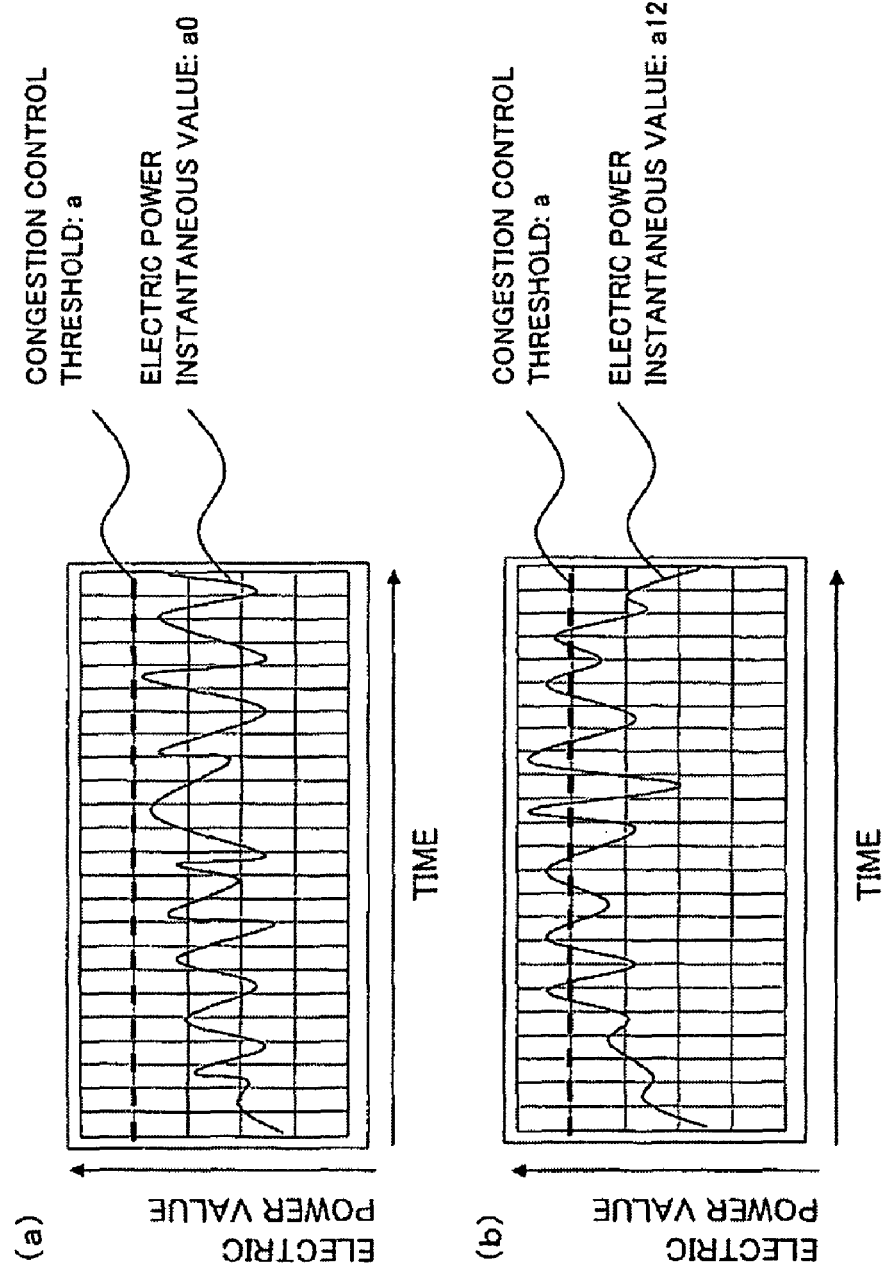

FIG. 11

MEAN VALUE GRAPHING INFORMATION MANAGED BY MAINTENANCE SERVER 102

| ITEM NUMBER | MEAN VALUE GRAPH IDENTIFICATION INFORMATION | MEAN VALUE GRAPHING INFORMATION |
|---|---|---|
| ITEM NUMBER 1 | MEAN VALUE GRAPH: 301 | ·ELECTRIC POWER INSTANTANEOUS VALUE 301<br>·FILTER COEFFICIENT k1 |
| ITEM NUMBER 2 | MEAN VALUE GRAPH: 302 | ·ELECTRIC POWER INSTANTANEOUS VALUE 302<br>·FILTER COEFFICIENT k2 |
| ITEM NUMBER 3 | MEAN VALUE GRAPH: 303 | ·ELECTRIC POWER INSTANTANEOUS VALUE 303<br>·FILTER COEFFICIENT k3 |
| ... | ... | ... |
| ITEM NUMBER n | MEAN VALUE GRAPH: 30n | ·ELECTRIC POWER INSTANTANEOUS VALUE 30n<br>·FILTER COEFFICIENT kn |

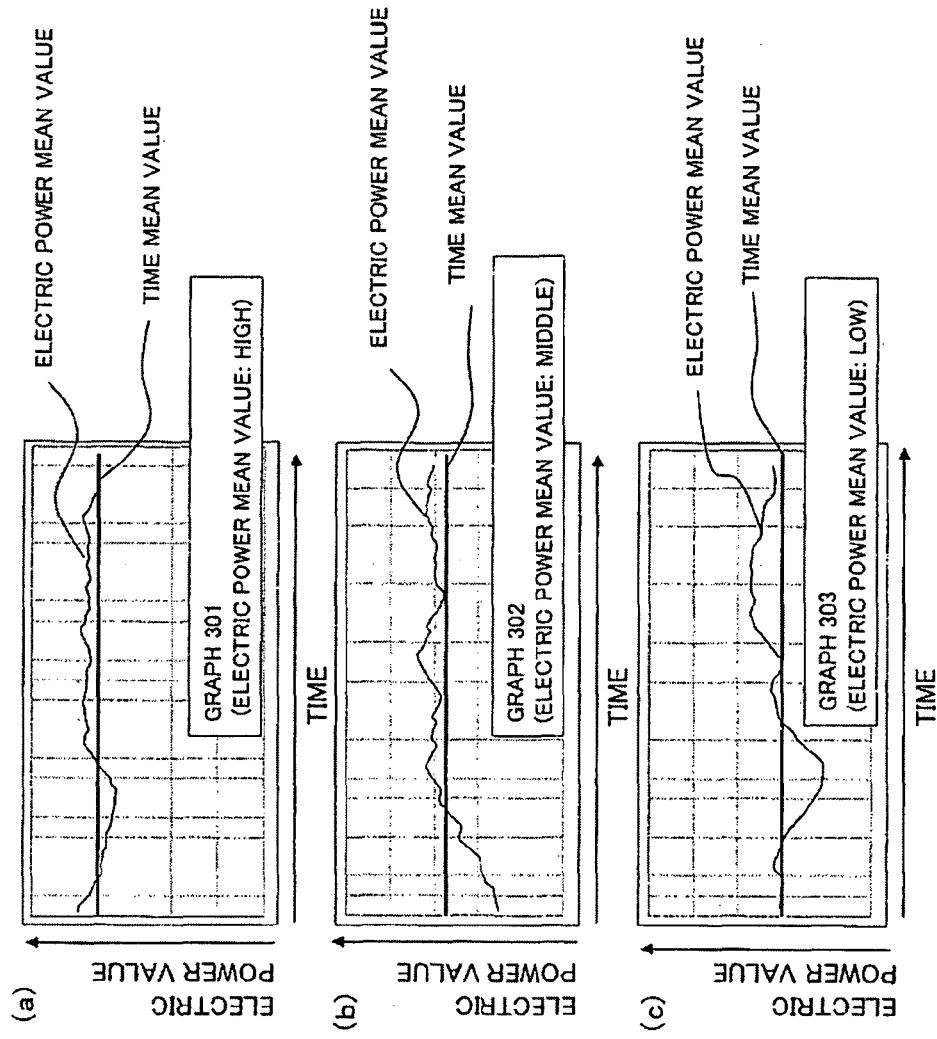

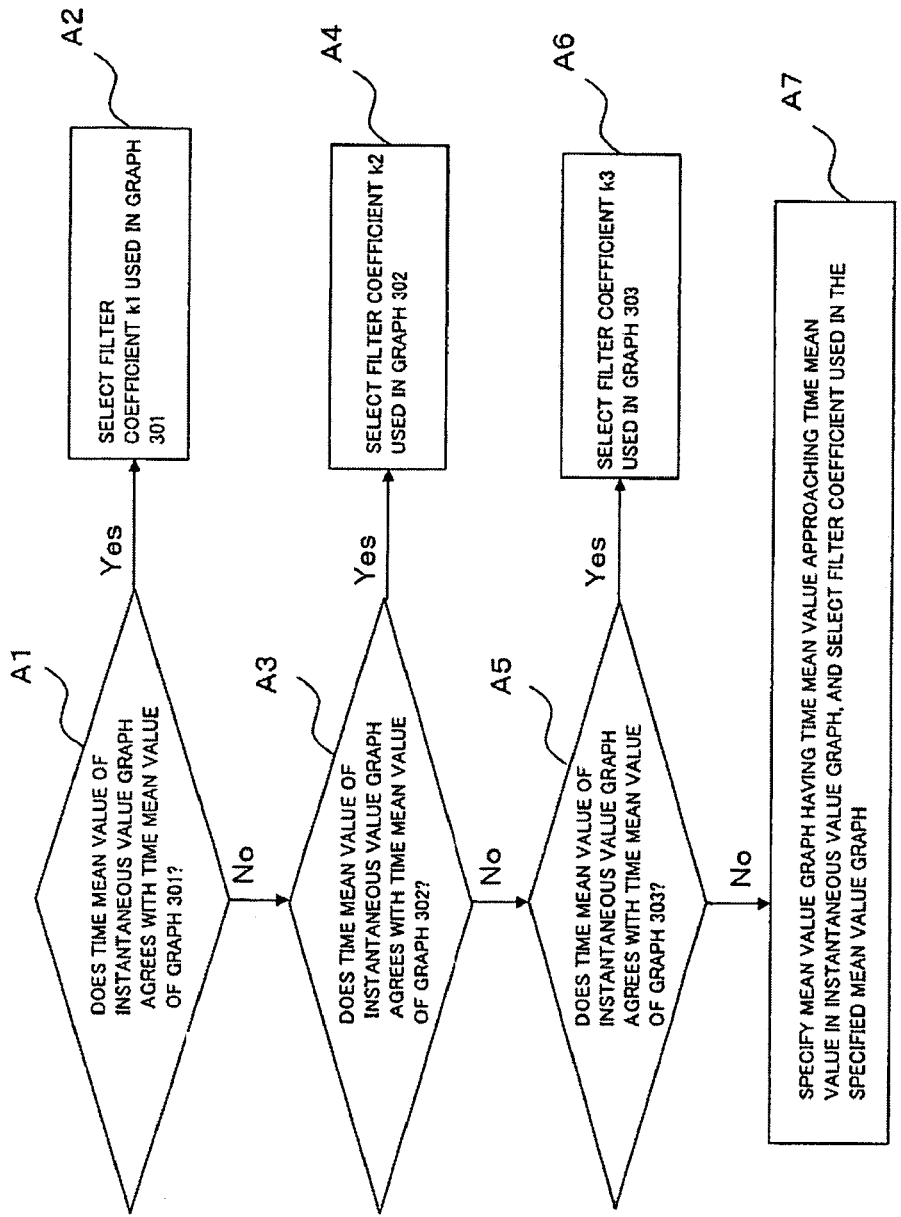

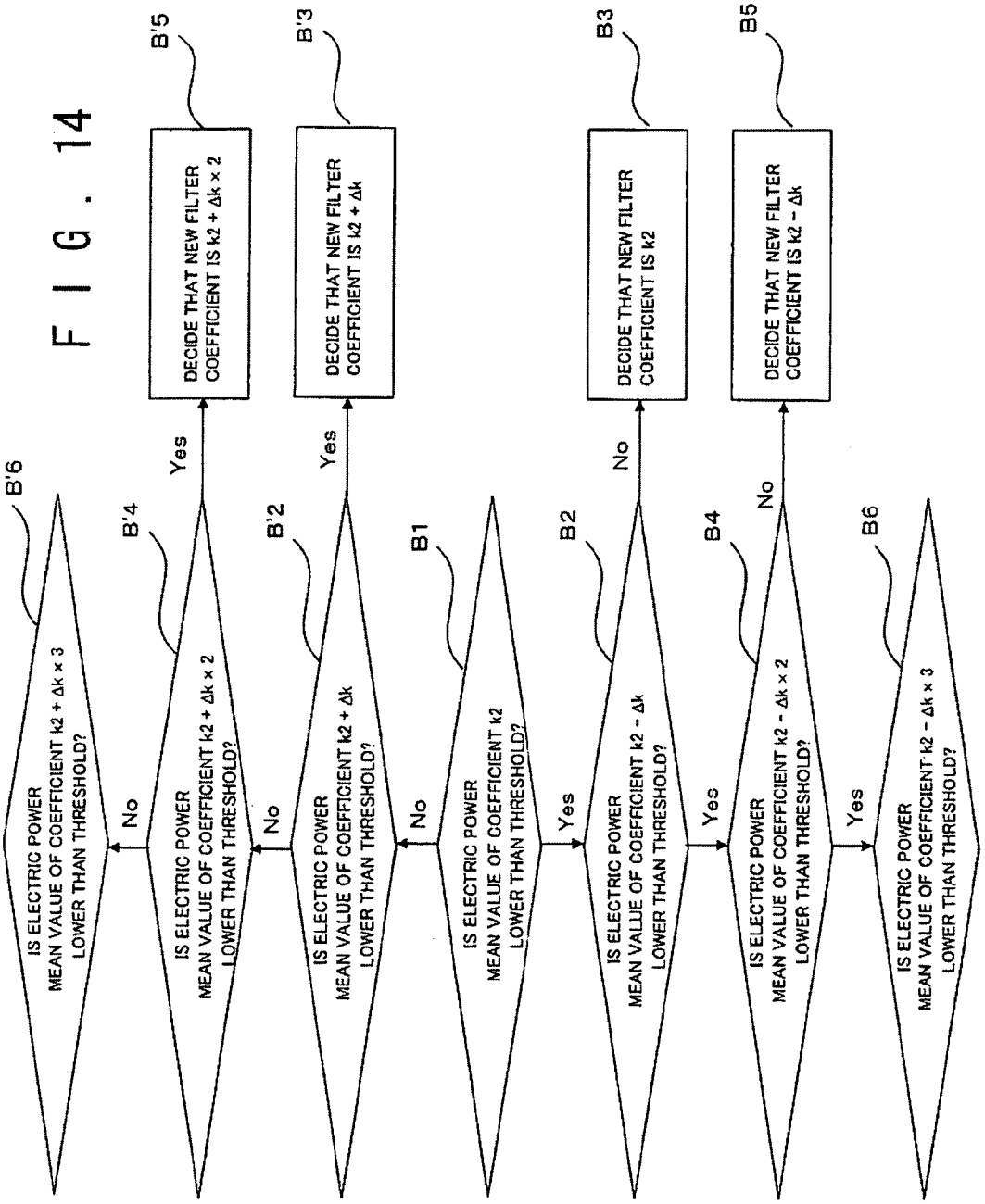

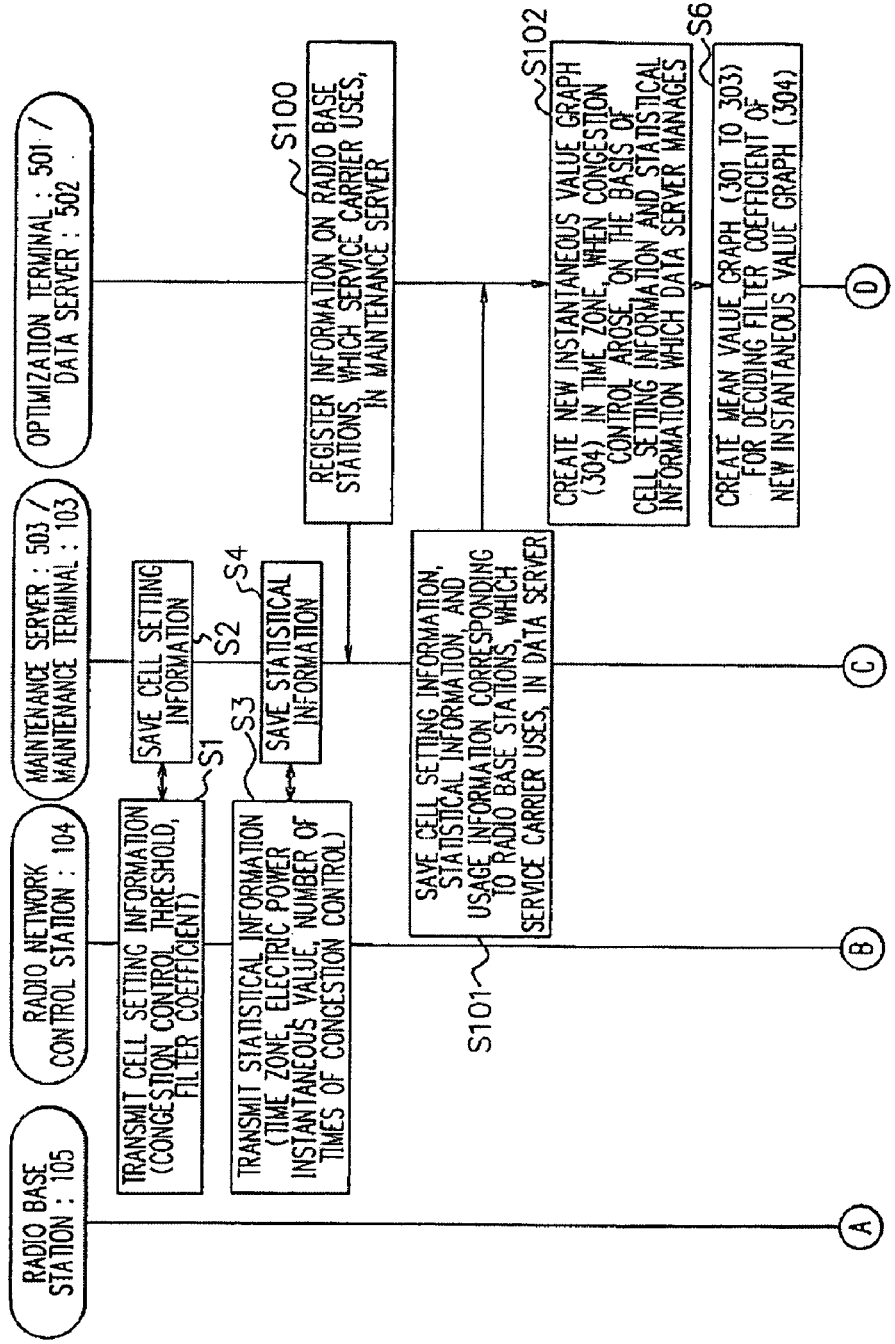

FIG. 18

CELL SETTING INFORMATION MANAGED BY MAINTENANCE SERVER 503

(TIME ZONE CONGESTION CONTROL THRESHOLD, FILTER COEFFICIENT)

| CONTROL STATION ID | CARRIER ID | USAGE INFORMATION | BASE STATION ID | CELL ID | CONGESTION CONTROL THRESHOLD | FILTER COEFFICIENT |
|---|---|---|---|---|---|---|
| CONTROL STATION IDa | CARRIER IDa | USAGE INFORMATION (PERIOD OF SERVICE, SERVICE CONDITION) | BASE STATION IDa | CELL IDa | CONGESTION CONTROL THRESHOLD a | FILTER COEFFICIENT ka |
| | | | | CELL IDb | CONGESTION CONTROL THRESHOLD b | FILTER COEFFICIENT kb |
| | CARRIER IDb | USAGE INFORMATION | BASE STATION IDb | CELL IDc | CONGESTION CONTROL THRESHOLD c | FILTER COEFFICIENT kc |
| | | | | CELL IDd | CONGESTION CONTROL THRESHOLD d | FILTER COEFFICIENT kd |

FIG. 19

CELL SETTING INFORMATION (CONGESTION CONTROL THRESHOLD, FILTER COEFFICIENT) AND STATISTICAL INFORMATION
(TIME ZONE, ELECTRIC POWER INSTANTANEOUS VALUE, NUMBER OF TIMES OF CONGESTION CONTROL) MANAGED BY DATA SERVER 502

| CARRIER ID | USAGE INFORMATION | BASE STATION ID | CELL ID | CONGESTION CONTROL THRESHOLD | FILTER COEFFICIENT | TIME ZONE | ELECTRIC POWER INSTANTANEOUS VALUE | NUMBER OF TIMES OF CONGESTION CONTROL |
|---|---|---|---|---|---|---|---|---|
| CARRIER IDa | USAGE INFORMATION (PERIOD OF SERVICE, SERVICE CONDITION, ETC.) | BASE STATION IDa | CELL IDa | CONGESTION CONTROL THRESHOLD a | FILTER COEFFICIENT ka | DATE & TIME 0:00 | ELECTRIC POWER INSTANTANEOUS VALUE a0 | 0 TIMES |
| | | | | | | DATE & TIME 1:00 | ELECTRIC POWER INSTANTANEOUS VALUE a1 | 0 TIMES |
| | | | | | | ... | ... | ... |
| | | | | | | DATE & TIME 12:00 | ELECTRIC POWER INSTANTANEOUS VALUE a12 | 3 TIMES |
| | | | | | | ... | ... | ... |
| | | | CELL IDb | CONGESTION CONTROL THRESHOLD b | FILTER COEFFICIENT kb | DATE & TIME 0:00 | ELECTRIC POWER INSTANTANEOUS VALUE b0 | 0 TIMES |
| | | | | | | DATE & TIME 1:00 | ELECTRIC POWER INSTANTANEOUS VALUE b1 | 1 TIMES |
| | | | | | | DATE & TIME 12:00 | ELECTRIC POWER INSTANTANEOUS VALUE b12 | 3 TIMES |
| | | | | | | ... | ... | ... |

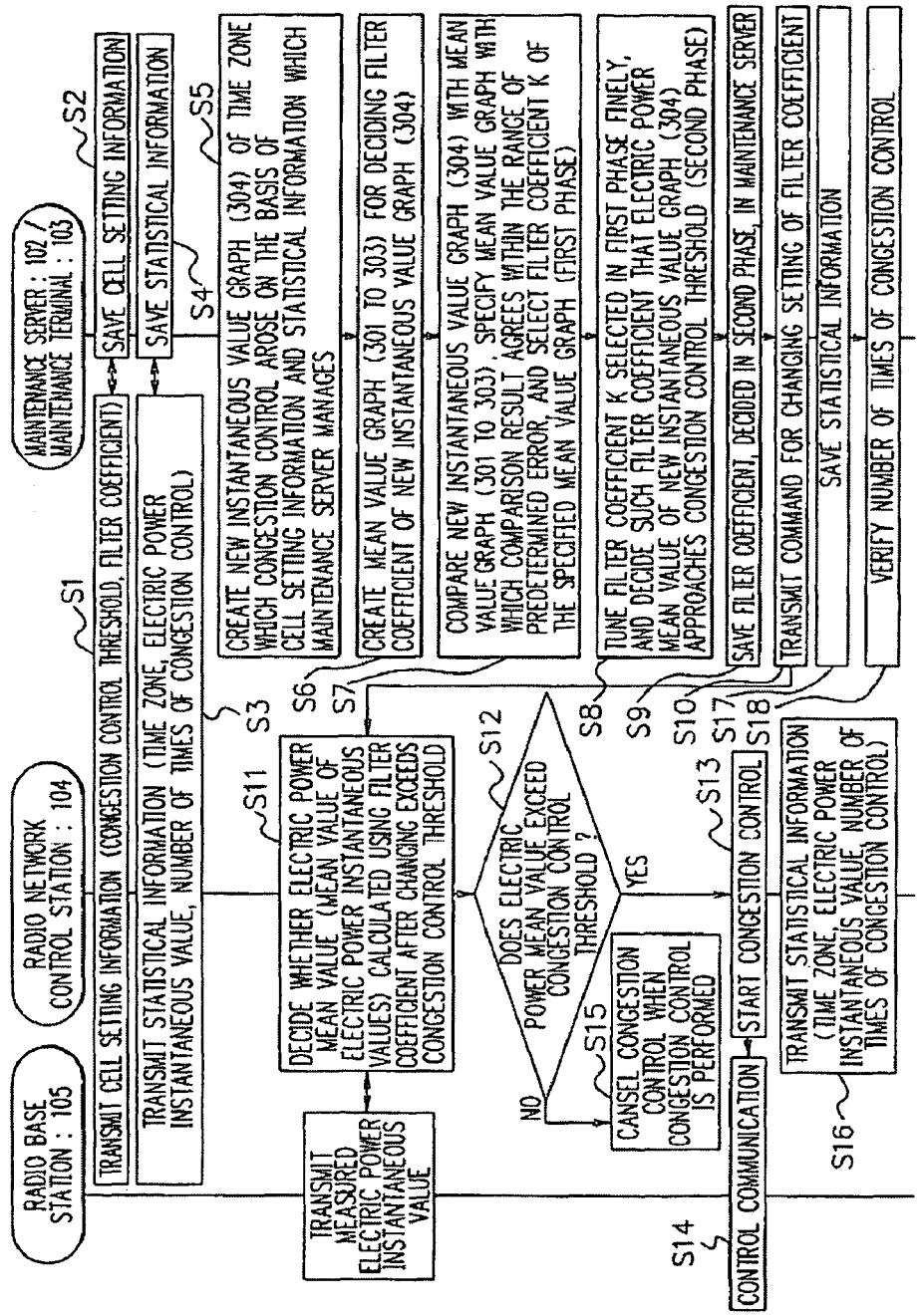

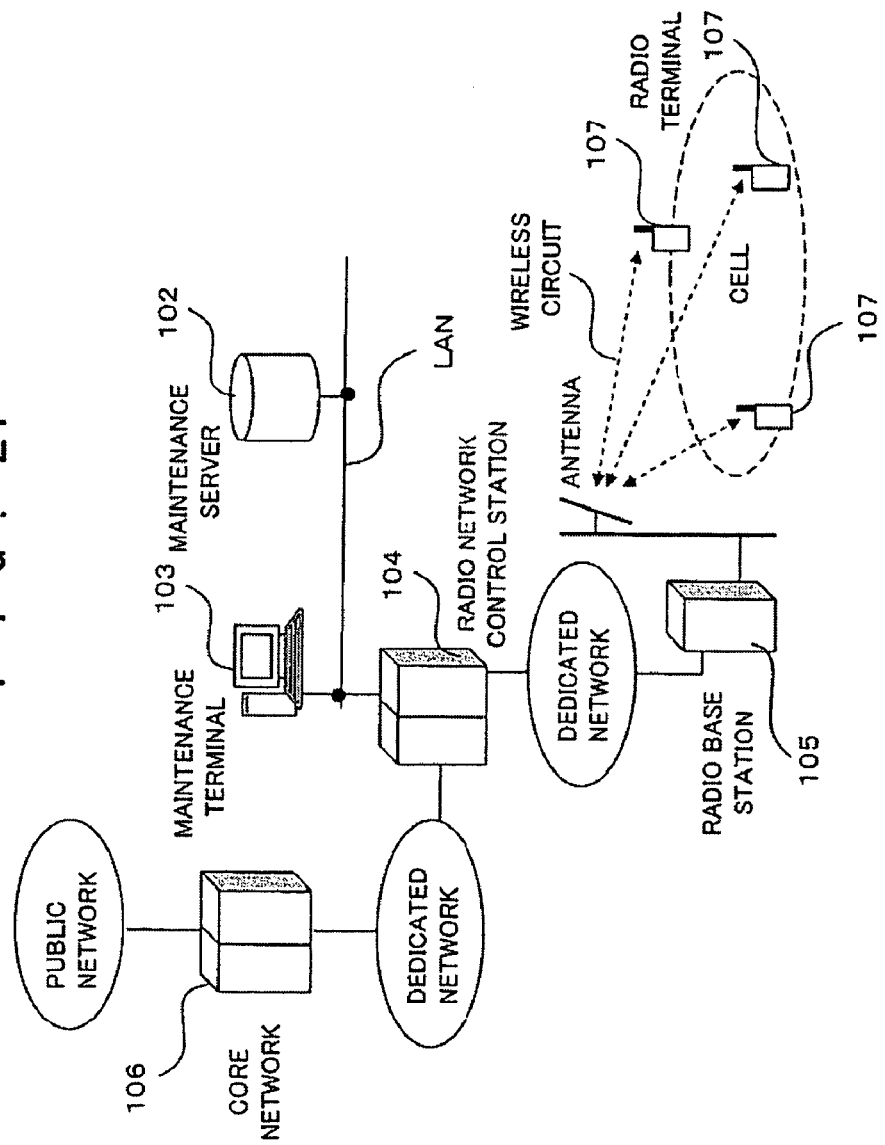

FIG. 22

CELL SETTING INFORMATION
(CONGESTION CONTROL THRESHOLD, FILTER COEFFICIENT)
MANAGED BY RADIO BASE STATION 105

| CELL ID | CONGESTION CONTROL THRESHOLD | FILTER COEFFICIENT |
|---------|------------------------------|--------------------|
| CELL IDa | CONGESTION CONTROL THRESHOLD a | FILTER COEFFICIENT ka |
| CELL IDb | CONGESTION CONTROL THRESHOLD b | FILTER COEFFICIENT kb |

COEFFICIENT DECISION APPARATUS, RADIO COMMUNICATION SYSTEM, COEFFICIENT DECISION METHOD, AND MEMORY MEDIUM

This application is based upon and claims the benefit of priority from Japanese patent application No. 2007-268007, filed on Oct. 15, 2007, the disclosure of which is incorporated herein in its entirety by reference.

BACKGROUND OF THE INVENTION

1. Technical Field

The present invention relates to a coefficient decision apparatus, a radio communication system, a coefficient decision method, and a memory medium which stores a coefficient decision program, and in particular, to a coefficient decision apparatus, a radio communication system, a coefficient decision method, and a memory medium which stores a coefficient decision program, which can decide a filter coefficient used at the time of averaging a transmission power value.

2. Background Art

In a common radio communication system, while a radio terminal moves freely between cells, radio communication is performed. For this reason, in a radio base station where many radio terminals exist in a cell, electric power energy may increase and a congestion state may arise. When a congestion state arises, various problems, such as a transit delay, quality degradation, and line disconnection, will arise.

For these reasons, when a congestion state arises, communication control of restricting a new call and the like is performed and various kinds of congestion control methods for resolving the congestion state are proposed.

For example, in Patent Document 1 (Japanese Patent Laid Open Publication No. 2005-210189), a radio base station controller starts congestion control when receiving a congestion occurrence notice from a radio base station. In addition, a technique of releasing congestion control at the time when a radio base station controller receives a congestion dissolution notice from a radio base station is disclosed.

In addition, Patent Document 2 (Japanese Patent Laid Open Publication No. 2006-135516) discloses a technique of judging an ATM (Asynchronous Transfer Mode) cell is congested when a predetermined frequency or more of discard of ATM cells arise, and restricting registration of a new call.

Furthermore, Patent Document 3 (Japanese Patent Laid Open Publication No. 2002-238073) discloses a technique of averaging measurements of a transmission power level, and regarding the averaged value to be a criterion to perform a call reception judgment.

Here, a congestion control method (a first method) used in a radio communication system will be described with referring to FIG. 23. FIG. 23 is a schematic diagram at the time of a radio network control station detecting a congestion state. A horizontal axis of FIG. 23 denotes the time, and a vertical axis denotes the electric power value. The radio network control station is a controller which controls a radio base station.

First, a radio network control station acquires an "electric power instantaneous value" (a transmission power value of a radio base station), which a radio base station measured for the unit of its cell, from radio base stations, as shown in FIG. 23.

Next, the radio network control station compares the "electric power instantaneous value" acquired from the radio base station with a "congestion control threshold" (value acting as a criterion of judgment for deciding whether a congestion arose or not), as shown in FIG. 23.

Then, as shown in FIG. 23, when the "electric power instantaneous value" exceeds the "congestion control threshold", the radio network control station judges that the power capacity of the radio base station reaches a limit value, starts congestion control to the radio base station, and controls communication with the radio base station and radio terminals.

Thereby, the radio network control station can perform congestion control to the radio base station on the basis of the "electric power instantaneous value."

However, as shown in FIG. 23, in the first method mentioned above, even in a state that the "electric power mean value" (value obtained by averaging the electric power instantaneous value) is lower than the "congestion control threshold" and power capacity of the radio base station still has a margin, when the "electric power instantaneous value" exceeds the "congestion control threshold", congestion control is started.

For this reason, when a situation that the "electric power instantaneous value" exceeds the "congestion control threshold" temporarily arises, the first method mentioned above cannot use the power capacity of the radio base station effectively. As the situation where the electric power instantaneous value exceeds the congestion control threshold temporarily, for example, an increase in momentary traffic, power variation of a radio terminal, etc. are mentioned.

In recent years, data transmission services have spread and it is supposed that an electric power instantaneous value fluctuates in burst by burst property of data communication. For this reason, as shown in FIG. 23, it is supposed that a situation that an "electric power instantaneous value" exceeds the "congestion control threshold" temporarily arises further easily.

Methods for using effectively power capacity of a radio base station include the following methods (a second method), for example.

First, an increase and decrease trend of an electric power instantaneous value is investigated, and a future electric power instantaneous value is estimated on the basis of a result of the investigation.

Then, when the future electric power instantaneous value (estimated electric power instantaneous value) and congestion control threshold are compared and the estimated electric power instantaneous value exceeds the congestion control threshold, it is judged that the power capacity of the radio base station will reach a limit value in the future, and it is controlled to increase a radio base station.

Thereby, since it is not necessary to perform the first method shown in FIG. 23 mentioned above, it becomes possible to use the power capacity of the radio base station effectively.

However, the second method mentioned above needs to investigate the increase and decrease trend of an electric power instantaneous value for a long period of time (for example, several weeks), and in order to estimate an estimated electric power instantaneous value, it will require most time.

In addition, since an increase and decrease range of an electric power instantaneous value is large, it becomes difficult to estimate an estimated electric power instantaneous value correctly.

In consequence, although the power capacity of a radio base station still has a margin, an excessive radio base station may be increased and a case that equipment cost is made to increase may arise.

In addition, although there is no margin in power capacity of a radio base station, a radio base station is not increased, but in consequence, radio wave interference increases and degradation of communication quality may be caused.

Methods for using effectively power capacity of a radio base station include the following methods (a third method), for example.

First, a radio network control station acquires an electric power instantaneous value, which a radio base station measured for the unit of its cell, from radio base stations.

Next, the radio network control station averages the electric power instantaneous values collected from each of the radio base stations using each filter coefficient, calculates each electric power mean value (value obtained by averaging the electric power instantaneous value), and compares each calculated electric power mean value with a congestion control threshold.

Then, when the electric power mean value exceeds the congestion control threshold, the radio network control station judges that the power capacity of the radio base station reaches a limit value, starts congestion control to the radio base station, and controls communication with the radio base station and radio terminals. The filter coefficient is used when calculating an electric power mean value.

Thereby, since the radio network control station performs the congestion control when an electric power mean value exceeds the congestion control threshold, it becomes possible to use the power capacity of the radio base station effectively.

However, an actual condition is that there is no standard for deciding the filter coefficient used by the third method mentioned above when calculating an electric power mean value.

For this reason, in a present system, in order to decide a filter coefficient, communication is interrupted temporarily, and complicated operations of deciding a most suitable filter coefficient are done with changing setting of a filter coefficient for the unit of its cell.

Hence, in the third method mentioned above, operating expenses in connection with deciding a most suitable filter coefficient, and a profit loss in connection with a temporary interruption of communication arise.

In consequence, the expenses accompanying a setting change of a filter coefficient becomes larger than applying the third method mentioned above to use the power capacity of radio base stations effectively.

Hence, it becomes necessary to develop a method of deciding efficiently a filter coefficient used when calculating an electric power mean value.

In addition, the above-mentioned Patent Documents 1 and 2 disclose techniques for resolving a congestion state when the congestion state arises.

Furthermore, the Patent Document 3 discloses a technique of averaging measured values of a transmission power level, and regarding the averaged value to be a criterion to perform a call reception judgment.

However, the above-mentioned Patent Documents 1 to 3 do not describe a specific solution for deciding efficiently a filter coefficient used for averaging the transmission power value, and do not suggest its necessity at all.

For this reason, it is not possible by the techniques of the above-mentioned Patent Documents 1 to 3 not only to decide a filter coefficient used for averaging the transmission power value efficiently, but also to aim at further effective use of power capacity of radio base stations.

SUMMARY

The present invention is made in view of the above-described situations, and aims at providing a coefficient decision apparatus, a radio communication system, a coefficient decision method, and a memory medium which stores a coefficient decision program, which enable to decide efficiently a filter coefficient used at the time of averaging a transmission power value, which is the above-mentioned task.

<Coefficient Decision Apparatus>

A coefficient decision apparatus according to the present invention is characterized by including acquisition means for acquiring at least a transmission power value, and decision means for specifying a congestion transmission power value, at which a congestion arises, among from the transmission power value acquired by the above-mentioned acquisition means, selecting a filter coefficient according to the above-mentioned congestion transmission power value, and deciding the selected filter coefficient as a new filter coefficient used at the time of averaging the above-mentioned transmission power value.

<Radio Communication System>

In addition, a radio communication system according to the present invention is a radio communication system including acquisition means for acquiring at least a transmission power value which each base station measured, and decision means for specifying a congestion transmission power value, at which a congestion arises, among from the transmission power value acquired by the above-mentioned acquisition means, selecting a filter coefficient according to the above-mentioned congestion transmission power value, and deciding the selected filter coefficient to be a new filter coefficient, wherein the radio communication system decides whether the congestion arose, on the basis of the electric power mean value averaged with the new filter coefficient decided by the above-mentioned decision means; and the radio communication system averages a transmission power value, which each base station measured, with a filter coefficient, and performs congestion control of a base station when the radio communication system judges that a congestion arose, on the basis of an electric power mean value obtained by the averaging.

Furthermore, a radio communication system according to the present invention is a radio communication system including a controller that averages a transmission power value, which each base station measured, with a filter coefficient, and performs congestion control of the base station when the radio communication system judges that a congestion arose, on the basis of an electric power mean value obtained by the averaging, and a coefficient decision apparatus that decides a filter coefficient, wherein the coefficient decision apparatus includes acquisition means for acquiring at least a transmission power value that the each base station measured, and decision means for specifying a congestion transmission power value, at which a congestion arises, among from the transmission power value acquired by the above-mentioned acquisition means, selecting a filter coefficient according to the above-mentioned congestion transmission power value, and deciding the selected filter coefficient to be a new filter coefficient, and that the controller decides whether the congestion arose, on the basis of the electric power mean value averaged with the new filter coefficient decided by the decision means.

Moreover, a radio communication system according to the present invention is a radio communication system including a base station that measures a transmission power value, averages the measured transmission power value with a filter coefficient, and performs congestion control when the base station judges that a congestion arose, on the basis of the averaged electric power mean value, and a coefficient decision apparatus that decides a filter coefficient, characterized in that the coefficient decision apparatus includes acquisition means for acquiring at least a transmission power value which the each base station measured, and decision means for specifying a congestion transmission power value, at which a congestion arises, among from the transmission power value acquired by the above-mentioned acquisition means, selecting a filter coefficient according to the above-mentioned congestion transmission power value, and deciding the selected filter coefficient to be a new filter coefficient, and that the base station decides whether the congestion arose, on the basis of the electric power mean value averaged with the new filter coefficient decided by the decision means.

<Coefficient Decision Method>

In addition, a coefficient decision method according to the present invention is characterized by including an acquisition step of acquiring at least a transmission power value, and a decision step of specifying a congestion transmission power value, at which a congestion arises, among from the transmission power value acquired by the above-mentioned acquisition step, selecting a filter coefficient according to the above-mentioned congestion transmission power value, and deciding the selected filter coefficient to be a new filter coefficient used at the time of averaging the above-mentioned transmission power value.

<Memory Medium>

Furthermore, a memory medium according to the present invention is characterized by making a computer execute acquisition processing of acquiring at least a transmission power value, and decision processing of specifying a congestion transmission power value, at which a congestion arises, among from the transmission power value acquired by the above-mentioned acquisition processing, selecting a filter coefficient according to the above-mentioned congestion transmission power value, and deciding the selected filter coefficient to be a new filter coefficient used at the time of averaging the above-mentioned transmission power value.

BRIEF DESCRIPTION OF THE DRAWINGS

FIG. 3 is a chart showing an example of a series of processing operations in the radio communication system according to the first exemplary embodiment;

FIG. 4 is a drawing showing an example of cell setting information (congestion control threshold and filter coefficient) managed by a radio network control station (104);

FIG. 5 is a drawing showing an example of statistical information (time zone, electric power instantaneous value, and number of times of congestion control) managed by radio network control station (104);

FIG. 6 is a drawing showing an example of cell setting information managed by a maintenance server (102);

FIG. 7 is a drawing showing an example of statistical information managed by the maintenance server (102);

FIG. 8 is a graph showing an example of a new instantaneous value graph (304) in time zones when the electric power instantaneous value exceeds the congestion control threshold;

FIG. 9 is a drawing showing an example of the electric power instantaneous value measured by a radio base station (105);

FIGS. 10A and 10B are graphs for describing a method of specifying time zones when the electric power instantaneous value exceeds the congestion control threshold;

FIG. 11 is a drawing showing an example of a mean value graphing information managed by the maintenance server (102);

FIGS. 12A to 12C are graphs showing examples of mean value graphs that become criteria for deciding a filter coefficient of the new instantaneous value graph (304);

FIG. 13 is a chart showing processing operations in a first phase of filter coefficient selection;

FIG. 14 is a chart showing processing operations in a second phase of the filter coefficient selection;

FIG. 18 is a drawing showing an example of cell setting information managed by a maintenance server (503);

FIG. 19 is a drawing showing an example of cell setting information and statistical information managed by a data server (502);

FIG. 20 is a chart showing an example of a series of processing operations in the radio communication system according to a third exemplary embodiment;

FIG. 21 is a diagram showing a system configuration example of the radio communication system according to the third exemplary embodiment;

FIG. 22 is a drawing showing an example of cell setting information managed by a radio base station (105)

EXEMPLARY EMBODIMENT

<Summary of Radio Communication System of this Embodiment>

Figure 1:
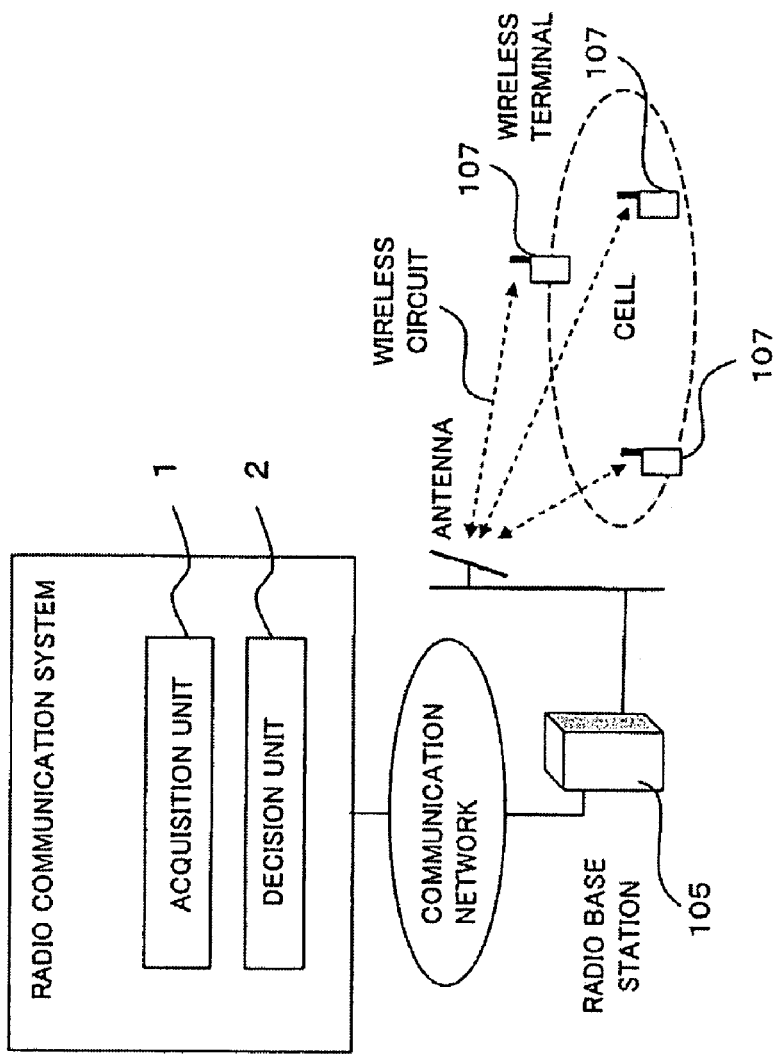
FIG. 1 is a diagram showing a system configuration example of a radio communication system according to an exemplary embodiment.

First, summary of a radio communication system in this embodiment will be described with reference to FIG. 1. FIG. 1 is a diagram showing a system configuration example for describing the summary of the radio communication system according to this embodiment.

The radio communication system in this embodiment is a radio communication system that averages a transmission power value, which each radio base station (105) measured, with a filter coefficient, and performs congestion control of a radio base station (105) when the radio communication system judges that a congestion arose, on the basis of the averaged electric power mean value.

The radio communication system in this embodiment is configured of an acquisition unit (1) and a decision unit (2). The acquisition unit (1) acquires at least a transmission power value that the radio base station (105) measured. The decision unit (2) specifies a congestion transmission power value, at which a congestion arises, among from the transmission power value acquired by the above-mentioned acquisition unit (1), selects a filter coefficient according to the above-mentioned congestion transmission power value, and decides the selected filter coefficient as a new filter coefficient. The congestion transmission power value means a transmission power value, at which a congestion arises, among the transmission power value which the radio base station (105) measured.

As for the radio communication system in this embodiment, the acquisition unit (1) acquires first at least the transmission power value that the radio base station (10o) measured with structure shown in FIG. 1. Next, the decision unit (2) specifies a congestion transmission power value, at which a congestion arises, among from the transmission power value acquired by the acquisition unit (1), selects a filter coefficient according to the congestion transmission power value, and decides the selected filter coefficient as a new filter coefficient.

Thereby, the radio communication system in this embodiment can decide efficiently the filter coefficient that is used at the time of averaging the transmission power value.

Then, the radio communication system in this embodiment decides whether a congestion arose, on the basis of the electric power mean value averaged with the new filter coefficient decided by the decision unit (2).

Thereby, the radio communication system in this embodiment does not judge that a congestion arises just in a state that the transmission power value exceeds the congestion control threshold temporarily, and never performs congestion control of the radio base station (105), and hence, it becomes possible to aim at effective use of power capacity of the radio base station (105). Hereafter, with reference to accompanying drawings, the radio communication system of this embodiment will be described in detail.

(First Exemplary Embodiment)
<System Configuration of Radio Communication System>

Figure 2:
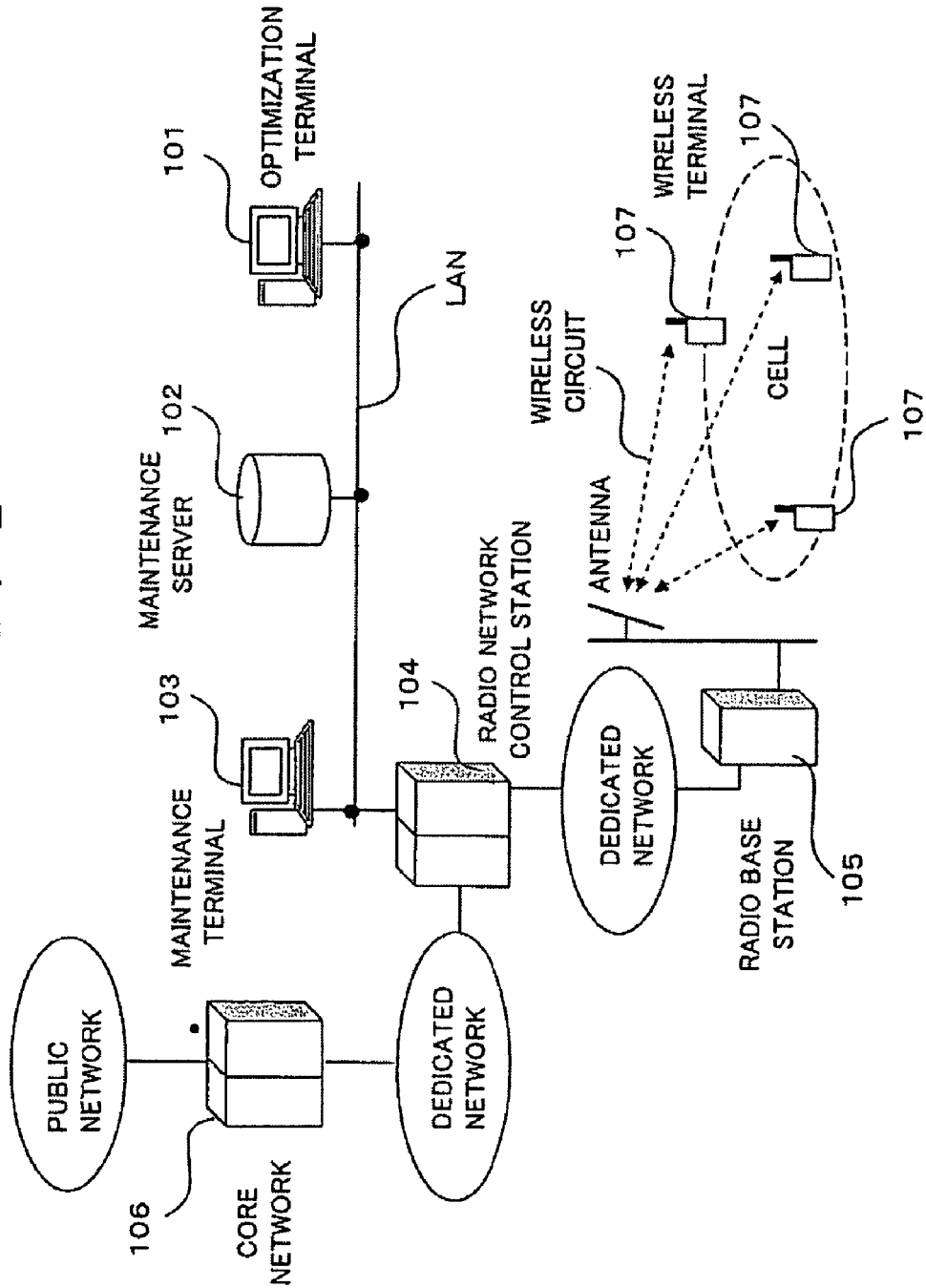
FIG. 2 is a diagram showing a system configuration example of a radio communication system according to a first exemplary embodiment.

First, system configuration of the radio communication system of this embodiment will be described with reference to FIG. 2. FIG. 2 is a diagram showing a system configuration example of a radio communication system of this embodiment.

The radio communication system in this embodiment includes an optimization terminal (101), a maintenance server (102), a maintenance terminal (103), a radio network control station (104), a radio base station (105), a core network (106), and radio terminals (107).

<Optimization Terminal: 101>

The optimization terminal (101) is an information processing apparatus, such as a personal computer. The optimization terminal (101) in this embodiment has a function of acquiring cell setting information (congestion control threshold and filter coefficient) and statistical information (time zone, electric power instantaneous value, and number of times of congestion control) from the maintenance server (102). In addition, the optimization terminal (101) has a function of deciding a new filter coefficient on the basis of the cell setting information and statistical information that are acquired from the maintenance server (102). That is, the optimization terminal (101) includes the acquisition unit (1) and a decision unit (2) that are shown in FIG. 1, and functions as a coefficient decision apparatus that decides a filter coefficient.

The electric power instantaneous value is a transmission power value per cell that the radio base station (105) measured. The congestion control threshold is a value acting as a criterion of judgment for deciding whether a congestion arose or not. The filter coefficient is used when an electric power mean value (value obtained by averaging electric power instantaneous value) is calculated. The time zone is information for specifying a time zone when the radio base station (105) measured the electric power instantaneous value. The number of times of congestion control is information for specifying the number of times that the radio network control station (104) has performed congestion control.

<Maintenance Server: 102>

A maintenance server (102) is an information processing apparatus, such as a workstation. The maintenance server (102) in this embodiment acquires cell setting information and statistical information from the radio network control station (104), and has a function of saving the acquired cell setting information and statistical information in the maintenance server (102).

<Maintenance Terminal: 103>

The maintenance terminal (103) is an information processing apparatus, such as a workstation. The maintenance terminal (103) in this embodiment has a function of acquiring cell setting information from the maintenance server (102), and changing setting of the cell setting information in the radio network control station (104) on the basis of the acquired cell setting information.

<Radio Network Control Station: 104>

The radio network control station (104) is a controller that controls the radio base station (105), and is installed in at least one place. The radio network control station (104) in this embodiment has a function of managing cell setting information and statistical information of the radio base station (105) that exists in a subordinate of the radio network control station (104). In addition, the radio network control station (104) has a function of transmitting the cell setting information and statistical information to the maintenance server (102), and saving them in the maintenance server (102). In addition, the radio network control station (104) has a function of acquiring information on the electric power instantaneous value (time zone and electric power instantaneous value) from the radio base station (10o). In addition, the radio network control station (104) has a function of calculating an electric power mean value using a filter coefficient, deciding whether the calculated electric power mean value exceeds the congestion control threshold, performing congestion control according to the decision result, and controlling communication between the radio base station (105) and radio terminals (107).

<Radio Base Station: 105>

The radio base station (105) is a communication apparatus that performs radio communications with the radio terminals (107) and at least one set of radio base station (105) is installed. However, in view of system implementation, it is preferable to install a large number of radio base stations (105) broadly. The radio base station (105) in this embodiment forms at least one cell. In addition, the radio base station (105) establishes a wireless circuit with the radio terminals (107) that exist in a coverage (inside of a cell) of an electric wave outputted from an antenna of the radio base station (105). In addition, the radio base station (105) has a function of transmitting the transmission power value (electric power instantaneous value), totaled in all the radio terminals (107) that establish wireless circuits within the cell, to the radio network control station (104) according to a control instruction of the radio network control station (104).

<Core Network: 106>

The core network (106) is a part that performs position control, call control, service control, and the like, and is configured of at least one set. Configuration of the core network (106) in this embodiment is not limited in particular, but any configuration is applicable. For example, the core network (106) can be configured of HLR (Home Location Register) of a mobile communication subscriber database, MSC (Mobile Switching Center) for circuit switching, SGSN (Serving GPRS Support Node) for packet switching, GMSC (Gateway Mobile Switching Center) for a gateway office of a fixed line switching network, GGSN (Gateway GPRS Support Node) for Internet gateway offices, and the like.

<Radio Terminal: 107>

A radio terminal (107) is a communication apparatus that performs radio communication with the radio base station (105). The radio terminal (107) in this embodiment communicates with another communication apparatus while moving between cells (handover). In addition, it is connected to the Internet and performs packet communication.

In addition, in the system configuration shown in FIG. 2, the core network (106) and radio network control station (104) are connected via a dedicated network. In addition, the radio network control station (104) and radio base station (105) are connected via a dedicated network. In addition, the radio network control station (104), maintenance terminal (103), maintenance server (102), and optimization terminal (101) are connected via a LAN (Local Area Network). However, in the radio communication system in this embodiment, so long as information communication is possible between respective apparatuses, connecting configuration between respective apparatuses is not limited in particular, but it is possible to be connected in any communication configuration regardless of the wire or wireless.

<Processing Operations in Radio Communication System>

Next, with reference to FIG. 3, a series of processing operations in the radio communication system of this embodiment will be described in detail. FIG. 3 is a chart showing an example of the series of processing operations in the radio communication system according to this embodiment. In the following processing operations, the processing operations of the radio base stations (105), radio network control station (104), maintenance server (102)/maintenance terminal (103), and optimization terminal (101) will be described.

First, it is supposed that, before performing the processing operations in FIG. 3, as shown in FIGS. 4 and 5, the radio network control station (104) manages for the unit of its cell, cell setting information (congestion control threshold and filter coefficient) and statistical information (time zone, electric power instantaneous value, and number of times of congestion control) of a cell that exists under the radio network control station (104). The electric power instantaneous value is the transmission power value measured in the radio base station (105), and the radio network control station (104) acquires it from the radio base station (105). The time zone is information for specifying a time zone when the radio base station (105) measured the electric power instantaneous value. The number of times of congestion control is information for specifying the number of times that the radio network control station (104) has performed congestion control.

In FIG. 4, the cell setting information is managed by being related with a "base station ID" and a "cell ID." The "base station ID" is information for specifying the radio base station (105). In addition, the "cell ID" is information for specifying a cell. In addition, in FIG. 5, the statistical information is managed by being related with the "base station ID" and "cell ID."

Thus, FIGS. 4 and 5 show a state that two radio base stations (base station IDa and base station IDb) exist under the radio network control station (104), and the radio network control station (104) manages the cell setting information and statistical information of respective radio base stations for the unit of its cell (cell ID). It is supposed in this embodiment that on the premise of the above-mentioned state, a series of processing operations shown in FIG. 3 is performed.

First, as shown in FIG. 3, when receiving a cell setting information transmission request command from the maintenance server (102) or maintenance terminal (103), the radio network control station (104) transmits the cell setting information (congestion control threshold and filter coefficient) shown in FIG. 4 to the maintenance server (102) (Step S1).

When receiving the cell setting information from the radio network control station (104), the maintenance server (102) saves the received cell setting information for the unit of its cell in the maintenance server (102) (step S2).

Thereby, the maintenance server (102) can acquire the cell setting information (congestion control threshold and filter coefficient) managed for the unit of its cell by the radio network control station (104), and can save and manage the acquired cell setting information for the unit of its cell (cell ID), as shown in FIG. 6.

FIG. 6 shows a state that the maintenance server (102) manages the cell setting information (congestion control threshold and filter coefficient) by relating it with a "control station ID," a "base station ID" and a "cell ID." The "control station ID" is information for specifying the radio network control station (104).

By managing the cell setting information as shown in FIG. 6, the maintenance server (102) can specify a source radio network control station (104) of the acquired cell setting information. In addition, the maintenance server (102) can also specify a source radio base station (105) of the acquired cell setting information.

Next, when receiving a transmission request command of statistical information from the maintenance server (102) or maintenance terminal (103), the radio network control station (104) transmits the statistical information (time zone, electric power instantaneous value, and number of times of congestion control) shown in FIG. 5 to the maintenance server (102) (Step S3).

When receiving the statistical information from the radio network control station (104), the maintenance server (102) saves the received statistical information for the unit of its cell in the maintenance server (102) (step S4).

Thereby, the maintenance server (102) can acquire the statistical information (time zone, electric power instantaneous value, and number of times of congestion control) managed for the unit of its cell by the radio network control station (104), and can save and manage the acquired statistical information for the unit of its cell (cell ID), as shown in FIG. 7.

FIG. 7 shows a state that the maintenance server (102) manages the statistical information (time zone, electric power instantaneous value, and number of times of congestion control) by relating it with a "control station ID," a "base station ID" and a "cell ID."

By managing the statistical information as shown in FIG. 7, the maintenance server (102) can specify a source radio network control station (104) of the acquired statistical information. In addition, the maintenance server (102) can also specify a source radio base station (105) of the acquired statistical information.

In addition, so long as the maintenance server (102) can manage cell setting information and statistical information for the unit of its cell, an acquisition method and a management method of the cell setting information and statistical information are not limited in particular, but any methods can be applied.

For example, the radio network control station (104) can also transmit the cell setting information, shown in FIG. 4, and the statistical information, shown in FIG. 5, to the maintenance server (102) independently, and can save them in the maintenance server (102).

Next, the optimization terminal (101) acquires the cell setting information, shown in FIG. 6, and the statistical information, shown in FIG. 7, from the maintenance server (102), and specifies a time zone when congestion control arose, on the basis of the acquired cell setting information and statistical information. Then, on the basis of the information (electric power instantaneous value and congestion control threshold) on the above-mentioned specified time zone, the optimization terminal (101) creates a new instantaneous value graph (304), as shown in FIG. 8 (step S5).

FIG. 8 shows the new instantaneous value graph (304) created on the basis of the information (electric power instantaneous value and congestion control threshold) on the time zone when the congestion arose, the vertical axis shows the electric power value, and the horizontal axis shows the time. A time mean value is a value obtained by plotting (selecting) the electric power instantaneous value every predetermined interval and averaging the plotted electric power instantaneous value. For example, as shown in FIG. 8, the electric power instantaneous value is plotted (selected) every predetermined interval (black dots shown in FIG. 8). Then, a value obtained by dividing a total value (a total value of values of 12 pieces of the black dots shown in FIG. 8) of the plotted electric power instantaneous value by the plot number of "12" becomes the time mean value.

The following methods are mentioned as methods of creating the new instantaneous value graph (304) shown in FIG. 8.

First, the radio base station (105) measures the electric power instantaneous value of a cell for a predetermined duration (e.g., for 5 minutes) in every predetermined time zone (e.g., every 1 hour), as shown in FIG. 9. In this case, the horizontal axis (time) of the new instantaneous value graph (304) shown in FIG. 8 becomes the predetermined duration (for 5 minutes) when the electric power instantaneous value of the cell is measured. In addition, the vertical axis (electric power value) of the new instantaneous value graph (304) shown in FIG. 8 becomes the electric power instantaneous value of the cell.

FIG. 9 shows a state that the radio base station (105) forms two cells (cell IDa and cell IDb) and the radio base station (105) measured the electric power instantaneous value per cell (cell IDa and cell IDb) for a predetermined duration (for 5 minutes) in every predetermined time zone (e.g., every 1 hour).

Next, the radio base station (105) transmits the information (time zone and electric power instantaneous value) on the electric power instantaneous value, shown in FIG. 9, to the radio network control station (104), and the radio network control station (104) acquires the information on the electric power instantaneous value for the unit of its cell from the radio base station (105).

The radio network control station (104) acquires the information on the electric power instantaneous value from all the radio base stations (105) that exist under the radio network control station (104).

Thereby, the radio network control station (104) can manage the information on the electric power instantaneous value of cells, which exist under the radio network control station (104), for the unit of its cell (cell ID), as shown in FIG. 5. The information (time zone and electric power instantaneous value) on the electric power instantaneous value of the "base station IDa" shown in FIG. 5 corresponds to the information on the electric power instantaneous value shown in FIG. 9.

When acquiring the information on the electric power instantaneous value from the radio base station (105), the radio network control station (104) calculates an electric power mean value (value obtained by averaging the electric power instantaneous value) using a filter coefficient of the cell corresponding to the acquired information. Then, the radio network control station (104) judges whether the calculated electric power mean value exceeds the congestion control threshold, and when the electric power mean value exceeds the congestion control threshold, the radio network control station (104) starts congestion control to add one to the number of times of congestion control. For example, when acquiring the information on the "electric power instantaneous value a12" of the "cell IDa" shown in FIG. 5, the radio network control station (104) calculates the electric power mean value of "the electric power instantaneous value a12" using the "filter coefficient ka" which is shown in FIG. 4 and corresponds to the "cell IDa" of the acquired information. Then, the radio network control station (104) judges whether the calculated electric power mean value exceeds the "congestion control threshold a" of the "cell IDa" shown in FIG. 4, and when the electric power mean value exceeds the "congestion control threshold a", the radio network control station (104) starts congestion control to add one to the number of times of congestion control.

When adding one to the number of times of congestion control, the radio network control station (104) increases the information on the "number of times of congestion control", shown in FIG. 5, by one. Thereby, the radio network control station (104) manages the statistical information (time zone, electric power instantaneous value, and number of times of congestion control), shown in FIG. 5, for the unit of its cell (cell ID).

Next, the radio network control station (104) transmits the statistical information for the unit of its cell (cell ID), which is shown in FIG. 5, to the maintenance server (102).

Thereby, the maintenance server (102) saves and manages the statistical information for the unit of its cell (cell ID), which is shown in FIG. 5, in the maintenance server (102) as shown in FIG. 7.

In addition, the radio network control station (104) manages the cell setting information (congestion control threshold and filter coefficient) for the unit of its cell (cell ID) as shown in FIG. 4, and transmits the cell setting information for the unit of its cell (cell ID), which is shown in FIG. 4, to the maintenance server (102). Thereby, the maintenance server (102) saves and manages the cell setting information for the unit of its cell (cell ID), which is shown in FIG. 4, in the maintenance server (102) as shown in FIG. 6.

Next, the optimization terminal (101) acquires the cell setting information shown in FIG. 6, and the statistical information shown in FIG. 7 from the maintenance server (102), and creates the new instantaneous value graph (304) in the time zone when congestion control arose, on the basis of the acquired cell setting information and statistical information, as shown in FIG. 8.

First, the optimization terminal (101) specifies a time zone when congestion control arose, on the basis of the number of times of congestion control included in the statistical information. For example, since the number of times of congestion control in a time zone of time 12:00 in the "cell IDa" shown in FIG. 7 is "3 times", it is specified to be the time zone when congestion control arose. Next, on the basis of the electric power instantaneous value in the time zone when the congestion control arose, and the congestion control threshold when the congestion control arose, the optimization terminal (101) creates a new instantaneous value graph (304) shown in FIG. 8.

Thereby, the optimization terminal (101) can create the new instantaneous value graph (304) in the time zone when congestion control arose, on the basis of the cell setting information (congestion control threshold) and statistical information ((time zone, electric power instantaneous value, and number of times of congestion control), as shown in FIG. 8.

In addition, since the creation method of the new instantaneous value graph (304) mentioned above is an example, so long as it is possible to create the new instantaneous value graph (304) in the time zone when congestion control arose, as shown in FIG. 8, any methods can be applied.

For example, the optimization terminal (101) can also create the new instantaneous value graph (304) in a time zone when congestion control arose, by specifying the time zone when the electric power instantaneous value exceeded the congestion control threshold, on the basis of the cell setting information (congestion control threshold) and statistical information (time zone and electric power instantaneous value).

Specifically, an "electric power instantaneous value a0" measured in a time zone of time 0:00 in a "cell IDa" shown in FIG. 7 is assumed to be values as shown in the graph in FIG. 10A. In this case, since the "electric power instantaneous value a0" does not exceed a "congestion control threshold a", it is judged that it is not a time zone when the electric power instantaneous value exceeded the congestion control threshold.

In addition, an "electric power instantaneous value a12" measured in a time zone of time 12:00 in the "cell IDa" shown in FIG. 7 is assumed to be values as shown in the graph in FIG. 10B. In this case, since the "electric power instantaneous value a12" exceeds the "congestion control threshold a", it is judged that it is a time zone when the electric power instantaneous value exceeds the congestion control threshold.

Then, on the basis of the information (electric power instantaneous value and congestion control threshold) on the time zone (time zone of time 12:00 in the "cell IDa") when the electric power instantaneous value exceeds the congestion control threshold, the optimization terminal (101) creates the new instantaneous value graph (304), as shown in FIG. 8.

Thereby, the optimization terminal (101) can create the new instantaneous value graph (304) in the time zone when congestion control arose, as shown in FIG. 8 by specifying the time zone (time zone of time 12:00 in the "cell IDa") when the electric power instantaneous value exceeded the congestion control threshold. In this way, the optimization terminal (101) can also create the new instantaneous value graph (304) in a time zone when congestion control arose, as shown in FIG. 8 by specifying the time zone when the electric power instantaneous value exceeded the congestion control threshold, on the basis of the cell setting information (congestion control threshold) and statistical information ((time zone and electric power instantaneous value).

Next, returning to the processing operations in FIG. 3, the optimization terminal (101) creates a mean value graph becoming a criterion of judgment for deciding a filter coefficient of the new instantaneous value graph (304) created at step S5 shown in FIG. 3 (step S6).

In addition, as shown in FIG. 11, the maintenance server (102) manages multiple pieces of the mean value graphing information (electric power instantaneous value and filter coefficient) for creating the mean value graph, related with mean value graph identification information. The mean value graph identification information is information for identifying a mean value graph. Then, the optimization terminal (101) refers to the maintenance server (102), acquires the mean value graphing information (electric power instantaneous value and filter coefficient) shown in FIG. 11 from the maintenance server (102), and creates mean value graphs (301) to (303) shown in FIGS. 12A to 12C on the basis of the acquired mean value graphing information.

The mean value graphs (301) to (303) shown in FIGS. 12A to 12C show a state that a simulation is performed on the basis of the mean value graphing information (electric power instantaneous value and filter coefficient) acquired from the maintenance server (102).

For example, the mean value graph (301) shown in FIG. 12A is a graph created on the basis of the electric power instantaneous value 301 and the filter coefficient k1 of an "item number 1" shown in FIG. 11, and shows a graph that the electric power mean value of the electric power instantaneous value is a high value (for example, a value that the electric power mean value is about 80% of a maximum power value). An electric power mean value is a value obtained by averaging the electric power instantaneous value using a filter coefficient.

In addition, the mean value graph (302) shown in FIG. 12B is a graph created on the basis of the electric power instantaneous value 302 and the filter coefficient k2 of an "item number 2" shown in FIG. 11, and shows a graph that the electric power mean value of the electric power instantaneous value is a middle value (for example, a value that the electric power mean value is about 60% of the maximum power value).

Furthermore, the mean value graph (303) shown in FIG. 12C is a graph created on the basis of the electric power instantaneous value 303 and the filter coefficient k3 of an "item number 3" shown in FIG. 11, and shows a graph that the electric power mean value of the electric power instantaneous value is a low value (for example, a value that the electric power mean value is about 40% of the maximum power value).

The percentage (%) shows a value in the case of making a lower limit (minimum power value) of the vertical axis (electric power value) in the mean value graphs (301) to (303) 0%, and making an upper limit (maximum power value) 100%. In addition, the horizontal axis (time) of the mean value graph (301) is a predetermined duration when the electric power instantaneous value of a cell was measured. In addition, it is supposed that values of the vertical axis (electric power value), and the horizontal axis (time) of the new instantaneous value graph (304) shown in FIG. 8 and the mean value graph (301) to (303) shown in FIGS. 12A to 12C correspond mutually.

Generally, the higher the electric power mean value is, the larger the filter coefficient becomes, and hence, the relation of the filter coefficients k1, k2, and k3 becomes k1>k2>k3.

In addition, a mean value graph becomes a common graph used when a filter coefficient of each cell that constructs this system is decided.

For this reason, the maintenance server (102) creates in advance mean value graphing information for creating a mean value graph, and manages the created mean value graphing information by relating it with mean value graph identification information.

In addition, the management method of mean value graphing information is not limited in particular, but it is possible to manage the mean value graphing information by any methods.

For example, it is also possible to create a "filter coefficient", the "electric power instantaneous value" and the "electric power mean value" obtained by averaging the electric power instantaneous value with the filter coefficient as mean value graphing information, and to manage the mean value graphing information by the maintenance server (102).

In this case, the optimization terminal (101) specifies the electric power mean value, whose value approaches the electric power instantaneous value of the new instantaneous value graph (304), from the maintenance server (102) with reference to the maintenance server (102). Then, it also becomes possible to perform configuration so as to select the filter coefficient related with the specified electric power mean value from the maintenance server (102).

In addition, it is also possible to create a "filter coefficient", the "electric power instantaneous value," the "electric power mean value," and the "time mean value" as mean value graphing information, and to manage the mean value graphing information by the maintenance server (102).

In this case, the optimization terminal (101) specifies the time mean value, whose value approaches the time mean value of the new instantaneous value graph (304), from the maintenance server (102) with reference to the maintenance server (102). Then, it also becomes possible to perform configuration so as to select the filter coefficient related with the specified time mean value from the maintenance server (102). A time mean value is a value obtained by plotting (selecting) the electric power instantaneous value at every predetermined interval and averaging the plotted electric power instantaneous value. In addition, it is also possible to plot (select) the electric power mean value at every predetermined interval and to apply a value obtained by averaging the plotted electric power mean value.

Next, as a first phase of filter coefficient selection, the optimization terminal (101) compares the new instantaneous value graph (304), shown in FIG. 8, with the mean value graphs (301) to (303) shown in FIGS. 12A to 12C to specify the mean value graph to which the comparison result corresponds within a predetermined error range (e.g., the error is about 5% or less). Then, the optimization terminal (101) selects a filter coefficient of the specified mean value graph (step S7).

For example, the optimization terminal (101) compares the time mean value of the electric power instantaneous value in the new instantaneous value graph (304) shown in FIG. 8 with the time mean value of the electric power instantaneous value in the mean value graphs (301) to (303) shown in FIGS. 12A to 12C to specify the mean value graph having the time mean value whose value approaches the time mean value of the new instantaneous value graph (304). Then, the optimization terminal (101) selects a filter coefficient of the specified mean value graph.

In addition, when the time mean value of the new instantaneous value graph (304) shown in FIG. 8 is equal to or more than the congestion control threshold, setting of the congestion control threshold is changed to be higher than the time mean value so as to fulfill a condition that a time mean value is less than a congestion control threshold (e.g., 100% which is the maximum power value).

<Detailed Processing of First Phase of Filter Coefficient Selection>

Here, detailed processing of the first phase will be described with reference to FIGS. 8, 12, and 13. FIG. 13 is a chart showing processing operations in the first phase of filter coefficient selection.

First, the optimization terminal (101) compares the time mean value of the new instantaneous value graph shown in FIG. 8 with the time mean value in the mean value graph (301) shown in FIG. 12A to judge whether the time mean values agree (step A1).

When judging that the time mean values almost agree (e.g., when a comparison difference between the time mean values is about 5% or less) (step A1: Yes), the optimization terminal (101) judges that the mean value graph (301) approaches the new instantaneous value graph (304) to select the filter coefficient k1 used at the time of calculating the electric power mean value in the mean value graph (301) (step A2).

In addition, when judging that the time mean values do not agree (step A1: No), the optimization terminal (101) compares the time mean value of the new instantaneous value graph (304) with the time mean value in the mean value graph (302) shown in FIG. 12B to judge whether the time mean values agree (step A3).

When judging that the time mean values almost agree (step A3: Yes), the optimization terminal (101) judges that the mean value graph (302) approaches the new instantaneous value graph (304) to select the filter coefficient k2 used at the time of calculating the electric power mean value in the mean value graph (302) (step A4).

In addition, when judging that the time mean values do not agree (step A3: No), the optimization terminal (101) compares the time mean value of the new instantaneous value graph (304) with the time mean value in the mean value graph (303) shown in FIG. 12C to judge whether the time mean values agree (step A5).

When judging that the time mean values almost agree (step A5: Yes), the optimization terminal (101) judges that the mean value graph (303) approaches the new instantaneous value graph (304) to select the filter coefficient k3 used at the time of calculating the electric power mean value in the mean value graph (303) (step A6).

In addition, when judging that the time mean values do not agree (step A5: No), the optimization terminal (101) specifies the mean value graph having the time mean value which approaches the time mean value in the new instantaneous value graph (304) to select the filter coefficient used at the time of calculating the electric power mean value in the specified mean value graph (step A7).

Furthermore, a comparison method of the time mean value in the new instantaneous value graph (304) and the time mean value in the mean value graphs (301 to 303) is not limited in particular, but any comparison methods can be applied so long as it is possible to specify the mean value graph having the time mean value whose value approaches the time mean value of the new instantaneous value graph (304).

For example, although it is made in FIG. 13 to perform comparison in order of mean value graphs with a higher electric power mean value (order of 301→302→303), it is also possible to perform control so as to perform comparison in order of mean value graphs with a lower electric power mean value (order of 303→302→301).

In addition, it is also possible to perform control so as to compare the new instantaneous value graph (304) with a graph selected at random from a plurality of mean value graphs (301 to 303).

However, in consideration of processing time of the comparison processing, it is preferable to perform control so as to perform comparison in order of mean value graphs with a higher electric power mean value (order of 301→302→303) as shown in FIG. 13.

Moreover, it is also possible to perform control to specify at least one mean value graph, which has an electric power mean value approaching the time mean value of the new instantaneous value graph (304), from among a plurality of mean value graphs (301 to 303), and to compare the time mean value of the specified mean value graph with the time mean value of the new instantaneous value graph (304).

In this embodiment, the time mean value of the new instantaneous value graph (304) shown in FIG. 8 approaches the time mean value of the mean value graph (302) shown in FIG. 12B. For this reason, the optimization terminal (101) selects the filter coefficient k2 used at the time of calculating the electric power mean value of the mean value graph (302).

Next, returning to the processing operation in FIG. 3, the optimization terminal (101) finely tunes the filter coefficient k2 selected in the above-mentioned first phase as a second phase of filter coefficient selection. In this case, the optimization terminal (101) tunes the filter coefficient k2 finely so that the electric power mean value F(n) in the new instantaneous value graph (304) which is calculated using the filter coefficient k2 may approach the congestion control threshold in the new instantaneous value graph (304).

Then, the optimization terminal (101) decides the filter coefficient tuned finely as a new filter coefficient (step S8).

In addition, the electric power mean value F(n) is an electric power mean value of the electric power instantaneous value in certain time: n, and becomes a function of F(n)=F(F (n−1), M(n), k2). Where, F(n−1) is an electric power mean value in time: (n−1) just before time: n, M(n) is an electric power instantaneous value in time: n, and k2 is a filter coefficient which is selected in the above-mentioned first phase.

Thus, the electric power mean value F(n) becomes a formula expressed by weighting the electric power instantaneous value M(n) in certain time: n, and the electric power mean value F(n−1) in time: (n−1) just before the time: n with the filter coefficient k2. As a formula for calculating the electric power mean value F(n), the following (formula 1) is cited, for example.

$$F(n)=(1-a) \times F(n-1)+a \times M(n) \quad \text{(Formula 1)}$$

where $a=(1/2)^{(k2/2)}$ and F(0)=M(0) in start time n=0.

<Detailed Processing of Second Phase of Filter Coefficient Selection>

Figure 15:
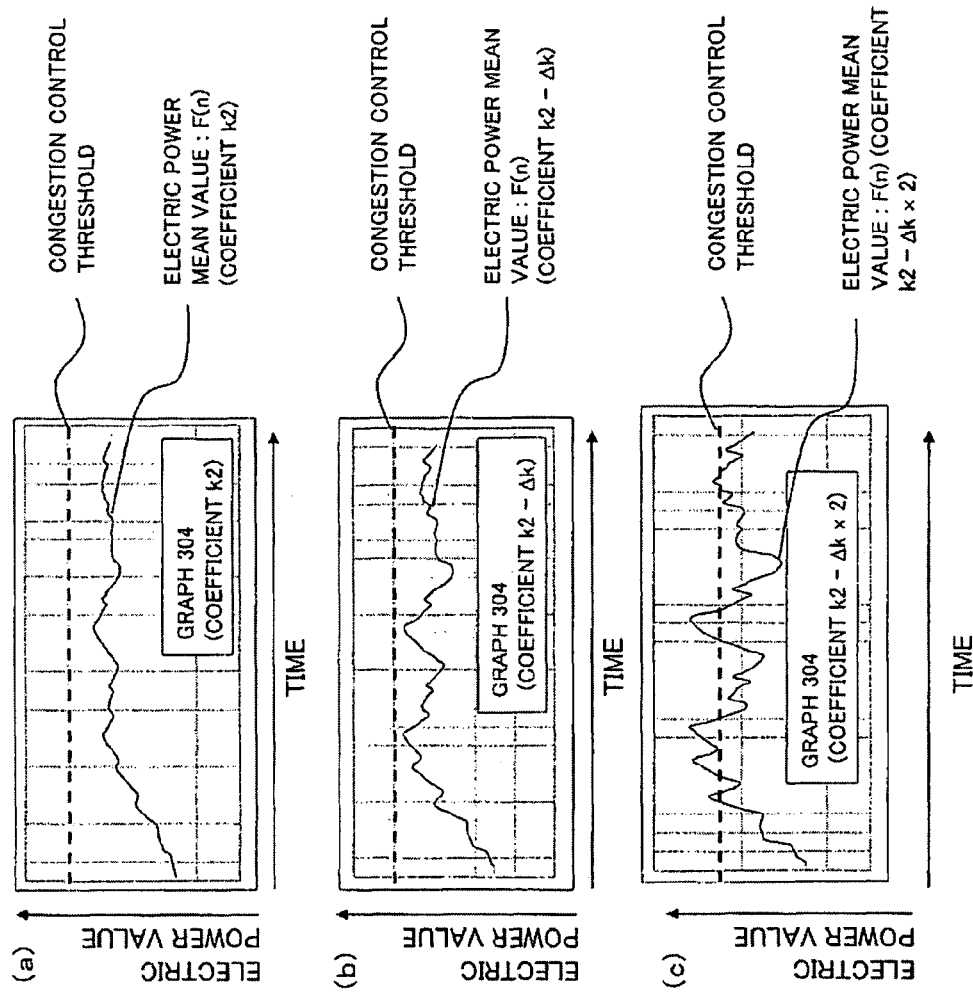
FIGS. 15A to 15C are graphs showing electric power mean values of new instantaneous value graphs (304) calculated using various kinds of filter coefficients.

Here, detailed processing of the second phase mentioned above will be described with reference to FIGS. 14 and 15. FIG. 14 is a chart showing processing operations in the second phase of the filter coefficient selection. FIGS. 15A to 15C are graphs showing the electric power mean values of the new instantaneous value graphs (304) calculated using various kinds of filter coefficients.

First, as shown in FIG. 15A, the optimization terminal (101) calculates the electric power mean value F(n) obtained by averaging the electric power instantaneous value in the new instantaneous value graph (304) using the filter coefficient k2 selected in the above-mentioned first phase.

Then, the optimization terminal (101) decides whether the electric power mean value F(n), calculated using the filter coefficient k2, is lower than the congestion control threshold in the new instantaneous value graph (304) (step B1). When the setting of the congestion control threshold is changed to be higher than the time mean value of the new instantaneous value graph (304), the optimization terminal (101) uses the congestion control threshold after the setting change in the processing at step S7 shown in FIG. 3 mentioned above.

When deciding that the electric power mean value F(n), calculated using the filter coefficient k2, is lower than the congestion control threshold (step B1: Yes), the optimization terminal (101) reduces a value of the filter coefficient k2 by a predetermined value (Δk) to obtain a value (k2−Δk), and tune the filter coefficient k2 finely. Then, as shown in FIG. 15B, the optimization terminal (101) calculates the electric power mean value F(n) obtained by averaging the electric power instantaneous value in the new instantaneous value graph (304) using the filter coefficient k2−Δk finely tuned by the predetermined value (Δk).

Then, the optimization terminal (101) decides whether the electric power mean value F(n), calculated using the finely tuned filter coefficient k2−Δk, is lower than the congestion control threshold (step B2).

When deciding that the electric power mean value F(n), calculated using the finely tuned filter coefficient k2−Δk, is not lower than the congestion control threshold (step B2: No), the optimization terminal (101) decides the filter coefficient k2 as a new filter coefficient (step B3).

In addition, when deciding that the electric power mean value F(n), calculated using the finely tuned filter coefficient k2−Δk, is lower than the congestion control threshold (step B2: Yes), the optimization terminal (101) reduces a value of the finely tuned filter coefficient k2−Δk by a predetermined value (Δk) to obtain a value (k2−Δk×2), and tune the filter coefficient k2−Δk finely.

Then, as shown in FIG. 15C, the optimization terminal (101) calculates the electric power mean value F(n) obtained by averaging the electric power instantaneous value in the new instantaneous value graph (304) using the filter coefficient k2−Δk×2 finely tuned by the predetermined value (Δk).

The optimization terminal (101) decides whether the electric power mean value F(n), calculated using the finely tuned filter coefficient k2−Δk×2, is lower than the congestion control threshold (step B4).

When deciding that the electric power mean value F(n), calculated using the finely tuned filter coefficient k2−Δk×2, is not lower than the congestion control threshold (step B4: No), the optimization terminal (101) decides the filter coefficient k2−Δk as a new filter coefficient (step B5).

In addition, when deciding that the electric power mean value F(n), calculated using the finely tuned filter coefficient k2−Δk×2, is lower than the congestion control threshold (step B4: Yes), the optimization terminal (101) reduces a value of the finely tuned filter coefficient k2−Δk×2 by a predetermined value (Δk) to obtain a value (k2−Δk×3), and tune the filter coefficient k2−Δk×2 finely.

Then, the optimization terminal (101) calculates the electric power mean value F(n) obtained by averaging the electric power instantaneous value in the new instantaneous value graph (304) using the finely tuned filter coefficient k2−Δk×3 finely tuned by the predetermined value (Δk).

The optimization terminal (101) decides whether the electric power mean value F(n), calculated using the finely tuned filter coefficient k2−Δk×3, is lower than the congestion control threshold (step B6). Until the electric power mean value F(n), calculated using the finely tuned filter coefficient, becomes higher than the congestion control threshold, the optimization terminal (101) reduces a value of the filter coefficient by a predetermined value (Δk) gradually to perform the decision processing mentioned above.

Then, when the electric power mean value F(n), calculated using the finely tuned filter coefficient, becomes higher than the congestion control threshold, the optimization terminal (101) decides the filter coefficient just before the finely tuned filter coefficient as a new filter coefficient.

In addition, when deciding that the electric power mean value F(n), calculated using the filter coefficient k2, is not lower than the congestion control threshold (step B1: No), the optimization terminal (101) increases a value of the filter coefficient k2 by a predetermined value (Δk) to obtains a value (k2+Δk), and tune the filter coefficient k2 finely. Then, the optimization terminal (101) calculates the electric power mean value F(n) obtained by averaging the electric power instantaneous value in the new instantaneous value graph (304) using the finely tuned filter coefficient k2+Δk finely tuned by the predetermined value (Δk).

Then, the optimization terminal (101) decides whether the electric power mean value F(n), calculated using the finely tuned filter coefficient k2+Δk, is lower than the congestion control threshold (step B'2).

When deciding that the electric power mean value F(n), calculated using the finely tuned filter coefficient k2+Δk, is lower than the congestion control threshold (step B'2: Yes), the optimization terminal (101) decides the filter coefficient k2+Δk as a new filter coefficient (step B'3).

In addition, when deciding that the electric power mean value F(n), calculated using the finely tuned filter coefficient k2+Δk, is not lower than the congestion control threshold (step B'2: No), the optimization terminal (101) increases a value of the finely tuned filter coefficient k2+Δk by a predetermined value (Δk) to obtain a value (k2+Δk×2), and tune the filter coefficient k2+Δk finely. Then, the optimization terminal (101) calculates the electric power mean value F(n) obtained by averaging the electric power instantaneous value in the new instantaneous value graph (304) using the finely tuned filter coefficient k2+Δk×2 finely tuned by the predetermined value (Δk).

Then, the optimization terminal (101) decides whether the electric power mean value F(n), calculated using the finely tuned filter coefficient k2+Δk×2, is lower than the congestion control threshold (step B'4).

When deciding that the electric power mean value F(n), calculated using the finely tuned filter coefficient k2+Δk×2, is lower than the congestion control threshold (step B'4: Yes), the optimization terminal (101) decides the filter coefficient k2+Δk×2 as a new filter coefficient (step B'5).

In addition, when deciding that the electric power mean value F(n), calculated using the finely tuned filter coefficient k2+Δk×2, is not lower than the congestion control threshold (step B'4: No), the optimization terminal (101) increases a value of the finely tuned filter coefficient k2+Δk×2 by a predetermined value (Δk) to obtain a value (k2+Δk×3), and tune the filter coefficient k2+Δk×2 finely. Then, the optimization terminal (101) calculates the electric power mean value F(n) obtained by averaging the electric power instantaneous value in the new instantaneous value graph (304) using the finely tuned filter coefficient k2+Δk×3 finely tuned by the predetermined value (Δk).

The optimization terminal (101) decides whether the electric power mean value F(n), calculated using the finely tuned filter coefficient k2+Δk×3, is lower than the congestion control threshold (step B'6).

Until the electric power mean value F(n), calculated using the finely tuned filter coefficient, becomes lower than the congestion control threshold, the optimization terminal (101) increases a value of the filter coefficient by a predetermined value (Δk) gradually to perform the decision processing mentioned above. Then, when the electric power mean value F(n), calculated using the finely tuned filter coefficient, becomes lower than the congestion control threshold, the optimization terminal (101) decides the finely tuned filter coefficient as a new filter coefficient.

In this embodiment, the optimization terminal (101) decides that the electric power mean value F(n), calculated using the finely tuned filter coefficient k2−Δk×2 which is shown in FIG. 15C, is higher than the congestion control threshold in the new instantaneous value graph (304). For this reason, the optimization terminal (101) decides the finely tuned filter coefficient k2−Δk as the new filter coefficient of the new instantaneous value graph (304).

Thereby, the optimization terminal (101) tunes the filter coefficient k2 finely (k2−Δk) so that the electric power mean value F (n) which is calculated using the tuned filter coefficient may approach the congestion control threshold in the new instantaneous value graph (304), and decides the filter coefficient k2−Δk tuned finely as a new filter coefficient.

Next, returning to the processing operation in FIG. 3, the optimization terminal (101) saves the new filter coefficient k2−Δk decided in the above-mentioned second phase in the maintenance server (102) on the basis of a cell ID in the new instantaneous value graph (304) (step S9).

Hence, the optimization terminal (101) can update the filter coefficient in the cell setting information shown in FIG. 6 saved in the maintenance server (102) to the new filter coefficient k2−Δk.

When the setting of the congestion control threshold is changed to be higher than the time mean value of the new instantaneous value graph (304), the optimization terminal (101) saves the congestion control threshold after the setting change in the maintenance server (102) in the processing at step S7 shown in FIG. 3 mentioned above.

Thereby, the optimization terminal (101) can also update the congestion control threshold in the cell setting information shown in FIG. 6 saved in the maintenance server (102) to the new congestion control threshold.

Next, the maintenance server (102) or maintenance terminal (103) specifies a cell ID of a cell, where the filter coefficient is updated, in the cell setting information saved in the maintenance server (102), and creates a change command for changing setting of the filter coefficient of the specified cell ID. In this case, the maintenance server (102) or maintenance terminal (103) also creates a change command for changing setting of a congestion control threshold when the congestion control threshold is updated. Then, the maintenance server (102) or maintenance terminal (103) transmits the created change commands, which are mentioned above, to the radio network control station (104) (step S10).

In addition, the creation and transmission method of the above-mentioned change commands are not limited in particular, but any methods are applicable. Then, the maintenance server (102) or maintenance terminal (103) can create the change commands manually, and can also transmit the created change commands to the radio network control station (104). In addition, the maintenance server (102) or maintenance terminal (103) can create the change commands automatically, and can also transmit the created change commands to the radio network control station (104).

When receiving the change commands, the radio network control station (104) changes the cell setting information, which is shown in FIG. 4 and is managed by the radio network control station (104), on the basis of the change commands.

Then, the radio network control station (104) uses the filter coefficient k2−Δk after a change to calculate the electric power mean value (a mean value of the electric power instantaneous values). Then, the radio network control station (104) judges whether the calculated electric power mean value exceeds the congestion control threshold (step S11).

When judging that the electric power mean value exceeds the congestion control threshold (step S12: Yes), the radio network control station (104) starts the congestion control to the cell (step S13). In this case, the radio network control station (104) transmits the cell ID of the object cell of which congestion control will be started, and a start notice of the congestion control to the radio base station (105).

When receiving the cell ID and start notice of the congestion control, the radio base stations (105) starts communication control of the object cell corresponding to the cell ID, and rejects new connection between the object cell and a radio terminal (107). In addition, the radio base station (105) performs control so as to make communication speed of a radio terminal (107) under communication within the object cell low (step S14).

Thereby, when the object cell is congested, the radio base station (105) can prevent an increase in electric power energy.

In addition, when judging that the electric power mean value of the object cell becomes lower than the congestion control threshold after starting the congestion control at step S13 (step S12: No), the radio network control station (104)

cancels the congestion control (step S15). In this case, the radio network control station (104) transmits the cell ID of the object cell of which congestion control will be cancelled, and a cancel notice of the congestion control to the radio base station (105).

When receiving the cell ID and cancel notice of the congestion control, the radio base stations (105) cancels the communication control of the object cell corresponding to the cell ID, and permits new connection between the object cell and a radio terminal (107). In addition, the radio base station 5 (105) cancels the control of the communication speed of the radio terminal (107) under communication within the object cell.

Next, the maintenance server (102) or maintenance terminal (103) performs the same processing as those at the above-mentioned steps S3 and S4, acquires statistical information after the filter coefficient change from the radio network control station (104), and manages the acquired statistical information for the unit of its cell in the maintenance server (102) (steps S16 and S17). Next, the maintenance server (102) or maintenance terminal (103) compares the statistical information after the filter coefficient change managed in the maintenance server (102), with the statistical information before the filter coefficient change, and confirms reduction of the number of times of congestion control (step S18).

In addition, the maintenance server (102) or maintenance terminal (103) can perform control again to change the filter coefficient when the maintenance server (102) or maintenance terminal (103) cannot confirm the reduction of the number of times of congestion control.

For example, the maintenance server (102) or maintenance terminal (103) acquires periodically statistical information after the filter coefficient change from the radio network control station (104), and confirms the number of times of congestion control included in the periodically acquired statistical information. Then, when the maintenance server (102) or maintenance terminal (103) cannot confirm the reduction of the number of times of congestion control, the maintenance server (102) or maintenance terminal (103) judges that congestion control has arisen continuously in the radio network control station (104), and performs control again to change the filter coefficient.

Furthermore, when the maintenance server (102) or maintenance terminal (103) cannot confirm the reduction of the number of times of congestion control even if repeating the setting change of the filter coefficient of the radio network control station (104) to change the filter coefficient into a predetermined value (e.g., maximum value), the maintenance server (102) or maintenance terminal (103) judges that power capacity of the radio base station (105) reaches a limit value. In this case, the maintenance server (102) or maintenance terminal (103) can also perform control so as to add a radio base station (105). Thereby, it becomes possible to judge correctly whether the power capacity of the radio base stations (105) reaches the limit value to judge correctly necessity of addition of the radio base station (105). In consequence, it becomes possible to reduce a facility investment expense of the radio base stations (105).

<Action and Effect of Radio Communication System of this Embodiment>

In this way, in the communication system in this embodiment, first, the maintenance server (102) acquires cell setting information (congestion control threshold and filter coefficient) and statistical information (time zone, electric power instantaneous value, and number of times of congestion control) from the radio network control station (104). Then, the maintenance server (102) saves and manages for the unit of its cell the acquired cell setting information and statistical information in the maintenance server (102).

Next, the optimization terminal (101) acquires the cell setting information and statistical information managed by the maintenance server (102), specifies a time zone when congestion control arose, on the basis of the acquired cell setting information and statistical information to create the new instantaneous value graph (304) in the time zone when the congestion control arose, as shown in FIG. 8, In addition, the optimization terminal (101) creates mean value graphs (301) to (303) shown in FIGS. 12A to 12C and become criteria for deciding a filter coefficient of the new instantaneous value graph (304).

Subsequently, the optimization terminal (101) compares the new instantaneous value graph (304) shown in FIG. 8, with the mean value graphs (301) to (303) shown in FIGS. 12A to 12C to specify the mean value graph (302) to which the comparison result corresponds within a predetermined error range. Then, the optimization terminal (101) selects the filter coefficient k2 used at the time of creating the specified mean value graph (302).

In addition, the optimization terminal (101) tunes the filter coefficient k2 finely (k2−Δk) so that the electric power mean value F (n) in the new instantaneous value graph (304) which is calculated using the selected filter coefficient k2 may approach the congestion control threshold in the new instantaneous value graph (304). Then, the optimization terminal (101) decides the finely tuned filter coefficient k2−Δk as the new filter coefficient used at the time of calculating an electric power mean value (a mean value of the electric power instantaneous values).

Thereby, the radio communication system in this embodiment can decide efficiently the filter coefficient that is used at the time of calculating the electric power mean value.

Next, the optimization terminal (101) saves the decided new filter coefficient k2−Δk in the maintenance server (102), and updates the filter coefficient in the cell setting information saved in the maintenance server (102) to the new filter coefficient k2−Δk. The maintenance server (102) transmits the filter coefficient k2−Δk, on which the cell setting information is updated, to the radio network control station (104), and changes the cell setting information managed by the radio network control station (104). Then, the radio network control station (104) calculates an electric power mean value of the cell using the filter coefficient k2−Δk after the change, judges whether the calculated electric power mean value exceeds the congestion control threshold, and performs congestion control according to the decision result.

Hence, when the electric power mean value (a mean value of the electric power instantaneous values) calculated by using the new filter coefficient exceeds the congestion control threshold, the radio network control station (104) performs congestion control. In consequence, the radio network control station (104) does not judge that a congestion arises just in a state that the electric power instantaneous value exceeds the congestion control threshold temporarily, and never performs congestion control of the radio base station (105), and hence, it becomes possible to aim at effective use of power capacity of the radio base station (105).

Next, when the maintenance server (102) or maintenance terminal (103) cannot confirm the reduction of the number of times of congestion control even if repeating the setting change of the filter coefficient of the radio network control station (104) to change the filter coefficient into a predetermined value (e.g., maximum value), the maintenance server (102) or maintenance terminal (103) controls to add a radio base station (105).

Thereby, the radio communication system in this embodiment can judge correctly whether the power capacity of the radio base station (105) reaches the limit value to judge correctly necessity of addition of the radio base station (105). In consequence, it becomes possible to reduce a facility investment expense of the radio base stations (105).

(Second Exemplary Embodiment)

Next, a second exemplary embodiment will be described.

A radio communication system in a second exemplary embodiment is characterized in that a plurality of carriers can change setting of each filter coefficient which is used at the time of calculating an electric power mean value.

Hence, one carrier does not change settings of filter coefficients in a lump, but a plurality of carriers can change settings dispersedly, and hence, it becomes possible to distribute the processing of the setting changes of filter coefficients. In addition, since it becomes possible to change setting to a filter coefficient according to each carrier, it becomes possible to change setting to the filter coefficient that can respond to various situations. Hereafter, with reference to FIGS. 16 to 19, the radio communication system of the second exemplary embodiment will be described in detail.

<System Configuration of Radio Communication System>

First, system configuration of the radio communication system of this embodiment will be described with reference to FIG. 16.

The radio communication system in this embodiment is configured of an optimization terminal (501), a data server (502), a maintenance server (503), the maintenance terminal (103), the radio network control station (104), the radio base station (105), the core network (106), and radio terminals (107).

The radio communication system in this embodiment is configured so that a service carrier may include the optimization terminal (501), and data server (502). In addition, it is configured so that a communications carrier may include the maintenance server (503) and maintenance terminal (103). In addition, although such configuration that one service carrier includes the optimization terminal (501) and data server (502) is shown in FIG. 16, a plurality of service carriers can include each optimization terminal (501) and each data server (502).

Figure 16:
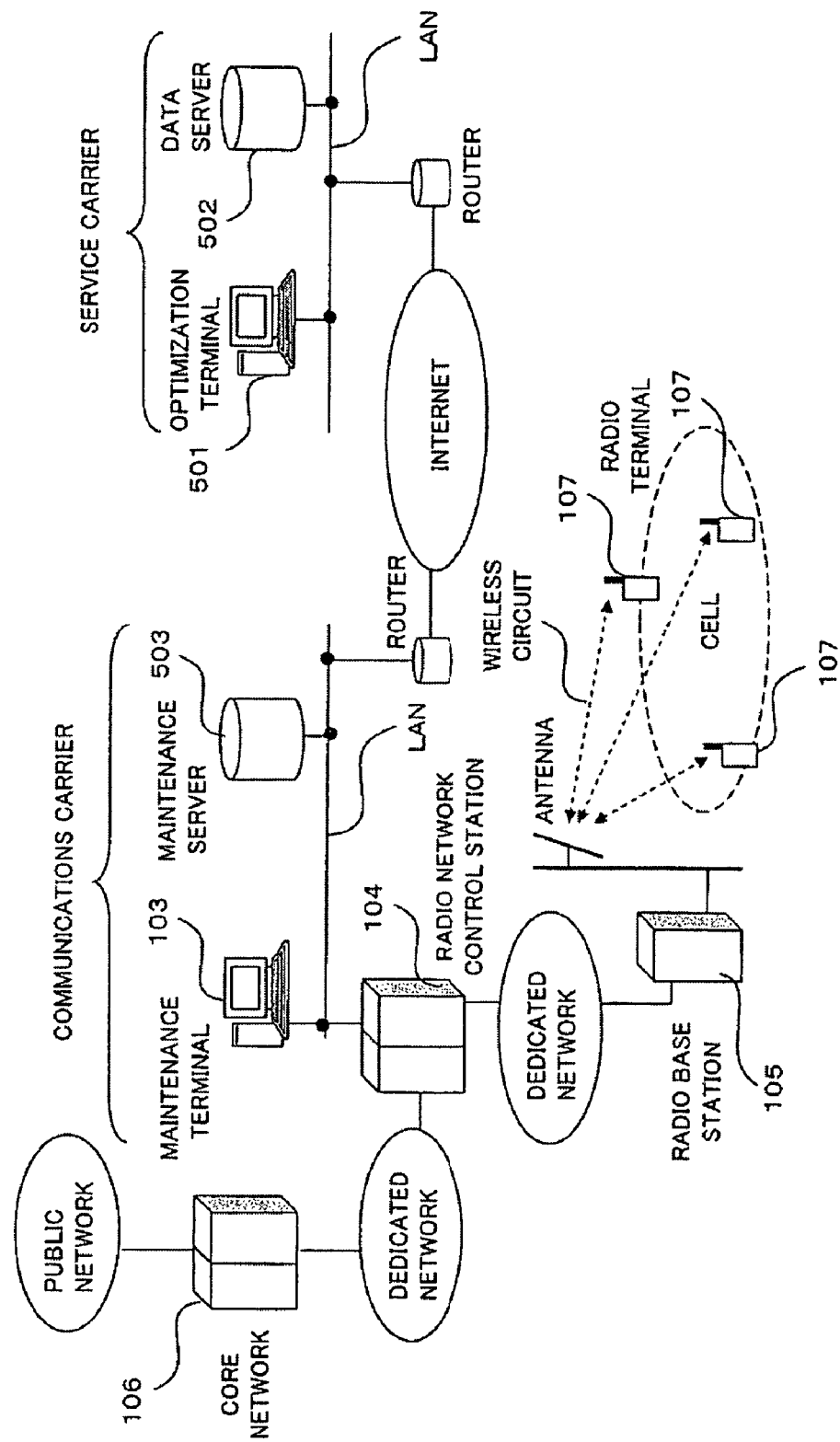
FIG. 16 is a diagram showing a system configuration example of a radio communication system according to a second exemplary embodiment.

In addition, the maintenance terminal (103), radio network control station (104), radio base station (105), core network (106), and radio terminals (107) which are shown in FIG. 16 are configured similarly to that of the first exemplary embodiment.

<Optimization Terminal: 501>

The optimization terminal (501) is an information processing apparatus, such as a personal computer, and at least one set is installed in each service carrier. The optimization terminal (501) in this embodiment has a function of acquiring cell setting information (congestion control threshold and filter coefficient) and statistical information (time zone, electric power instantaneous value, and number of times of congestion control) from the data server (502). In addition, the optimization terminal (501) has a function of deciding a new filter coefficient on the basis of the cell setting information and statistical information acquired from the data server (502). That is, the optimization terminal (501) is constructed of the acquisition unit (1) and decision unit (2) shown in FIG. 1, and functions as a coefficient decision apparatus that decides a filter coefficient.

<Data Server; 502>

The data server (502) is an information processing apparatus, such as a workstation, and at least one set is installed in each service carrier. The data server (502) in this embodiment has a function of acquiring the cell setting information, statistical information, and usage information from the maintenance server (503) corresponding to the radio base station (105) that a service carrier uses, and saving them in the data server (502). The usage information is information at the time of a service carrier using the radio base station (105), and for example, a period of service, a service condition, and the like in the case of a service carrier using the radio base station (105) are mentioned.

<Maintenance Server: 503>

The maintenance server (503) is an information processing apparatus, such as a workstation. The maintenance server (503) in this embodiment has a function of acquiring cell setting information and statistical information from the radio network control station (104), and saving the acquired cell setting information and statistical information in the maintenance server (503). In addition, the maintenance server (503) has a function of managing information on the radio base stations (105), which service carriers use, for the unit of the service carrier.

In addition, in the system configuration shown in FIG. 16, the core network (106) and radio network control station (104) are connected via a dedicated network. In addition, the radio network control station (104) and radio base station (105) are connected with a dedicated network. In addition, the radio network control station (104), maintenance terminal (103), and maintenance server (503) are connected via a LAN. In addition, the optimization terminal (501), and data server (502) are connected via a LAN. In addition, the apparatuses (103, 104, and 503) in a communications carrier side, and the apparatuses (501 and 502) in a service carrier side are connected through the Internet. However, in the radio communication system in this embodiment, so long as information communication is possible between respective apparatuses, connecting configuration between respective apparatuses is not limited in particular, but it is possible to be connected in any communication configuration regardless of the wire or wireless.

<Processing Operations in Radio Communication System>

Figure 17B:
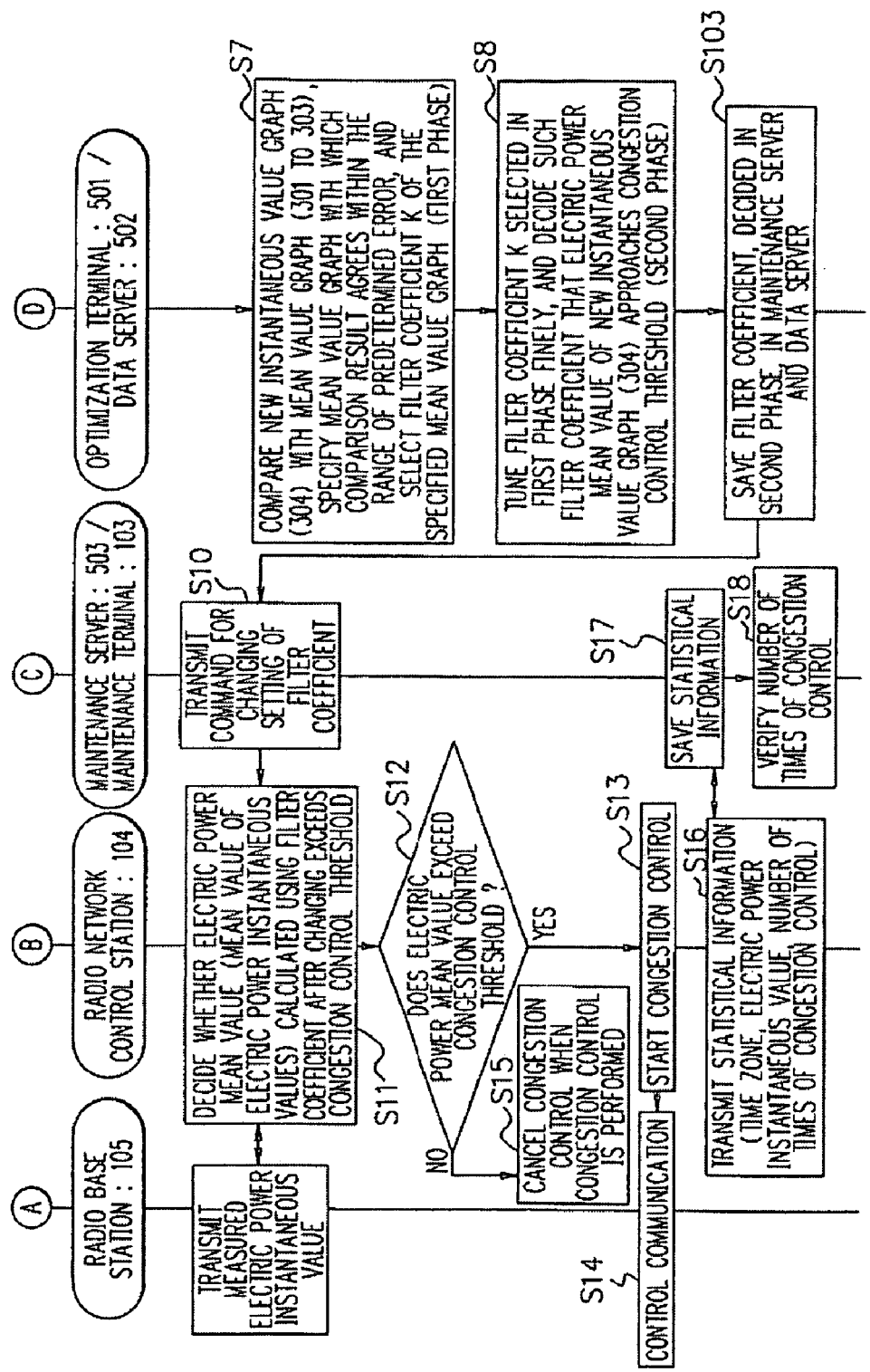
FIG. 17 is a chart showing an example of a series of processing operations in the radio communication system according to the second exemplary embodiment.
Figure 23:
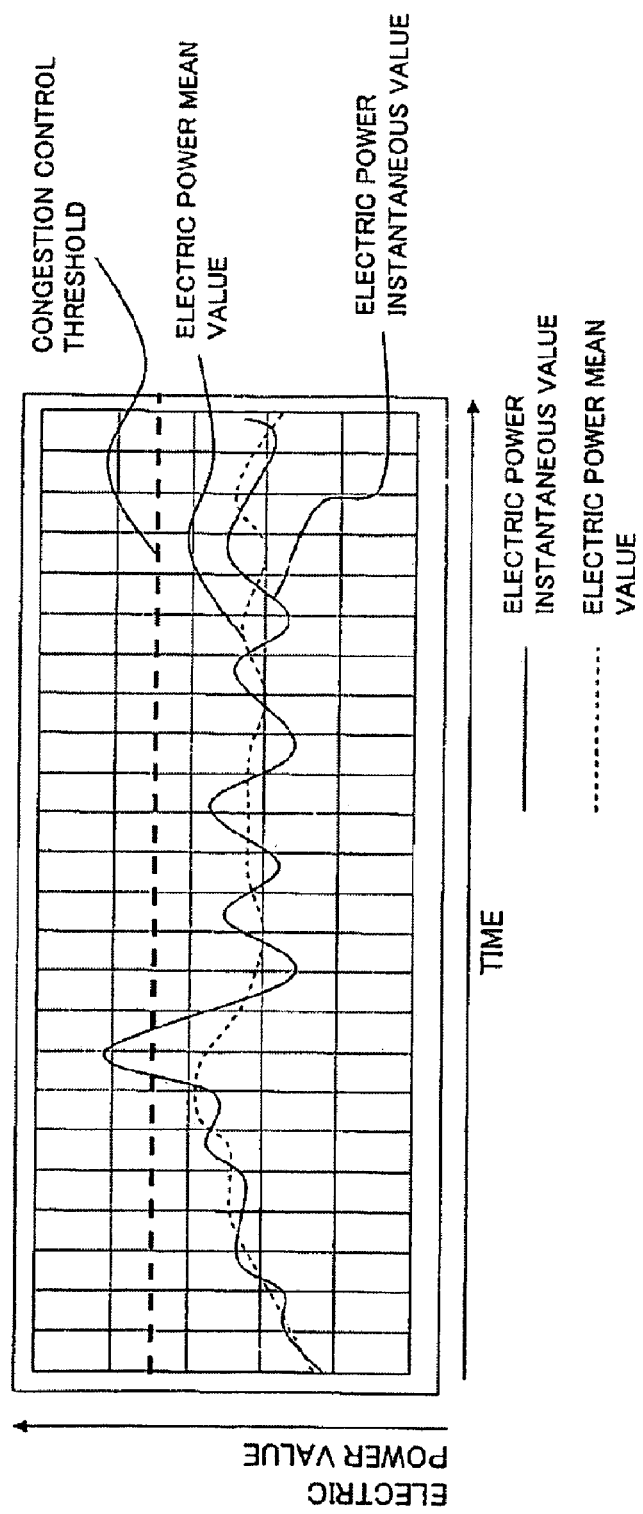
FIG. 23 is a graph for describing a general congestion control method relating to the present invention.

Next, with reference to FIG. 17, a series of processing operations in the radio communication system according to this embodiment will be described in detail. FIG. 17 is a chart showing an example of the series of processing operations in the radio communication system according to this embodiment. In addition, in the following processing operations, the processing operations of the radio base stations (105), radio network control station (104), maintenance server (503)/ maintenance terminal (103), and optimization terminal (501)/ data server (502) will be described.

First, similarly to the first exemplary embodiment, the maintenance server (503) acquires the cell setting information and statistical information managed for the unit of its cell by the radio network control station (104), and saves and manages the acquired cell setting information and statistical information in the maintenance server (503) (step S1 to S4).

Thereby, the maintenance server (503) can save and manage the cell setting information and statistical information in the maintenance server (503) as shown in FIGS. 6 and 7.

Next, the optimization terminal (501) decides the radio base stations (105), which a service carrier uses, with reference to the cell setting information and statistical information shown in FIGS. 6 and 7 and managed by the maintenance server (503). Then, the optimization terminal (501) registers information on the radio base stations (105), which each service carrier uses, with each carrier ID into the maintenance server (503) (step S100). The carrier ID is information for specifying each service carrier.

As a specific example of the above-mentioned processing, the communications carrier operates the maintenance terminal (103) and transmits the cell setting information and statistical information shown in FIGS. 6 and 7 and managed by the maintenance server (503), to the service carrier's optimization terminal (501). At this time, the communications carrier operates the maintenance terminal (103) to transmit also positional information on the radio base stations (105) under operation by a system, dealing information of the cell setting information and statistical information of those radio base stations (105), and blanket conditions, such as unit price information at the time of changing a filter coefficient, to the optimization terminal (501). The positional information is information for specifying a region where each of the radio base stations (105) is used. In addition, the dealing information is information, for example, contents of an agreement that the cell setting information and statistical information are not disclosed for a third party, etc. In this case, the service carrier operates the optimization terminal (501) to decide the radio base station (105), which the service carrier uses, on the basis of the cell setting information, statistical information, blanket conditions, etc. Then, the service carrier registers the information on the purport of agreeing on the blanket conditions related with the decided radio base station (105) in the maintenance server (503) and data server (502).

The maintenance server (503) specifies a base station ID of the radio base station (105), which the service carrier uses, with reference to the cell setting information, shown in FIG. 6, when the registration processing of the radio base station (105) which the service carrier uses is performed. Then, the maintenance server (503) gives the carrier ID for specifying the service carrier to the specified base station ID, and saves and manages the information on the radio base station (105) that the service carrier uses in the maintenance server (503).

Thereby, the maintenance server (503) updates the cell setting information, shown in FIG. 6, as shown in FIG. 18, and manages the cell setting information (congestion control threshold and filter coefficient) by relating it with the carrier ID. In addition, in FIG. 18, the usage information is also given with the carrier ID. The usage information is information at the time of a service carrier using the radio base station (105), and for example, a period of service, a service condition, and the like in the case of a service carrier using the radio base station (105) are mentioned.

So long as the maintenance server (503) can manage the information on the radio base station (105) that the service carrier uses, its management method is not limited to the management method mentioned above, but any management methods are applicable.

Next, the maintenance server (503) specifies the radio base station (base station ID), which the service carrier uses, on the basis of the carrier ID shown in FIG. 18, and transmits the cell setting information, statistical information, and usage information corresponding to the radio base station (base station ID), which the service carrier uses, to the data server (502). When receiving cell setting information, statistical information, and usage information from the maintenance server (503), the data server (502) saves and manages the received cell setting information and statistical information for the unit of its cell (cell ID) (step S101).

For example, the maintenance server (503) specifies the radio base station (base station IDa), which the service carrier uses, on the basis of the carrier IDa which the service carrier uses. Then, the maintenance server (503) transmits the cell setting information, statistical information, and usage information corresponding to the radio base station (base station IDa), which the service carrier (carrier IDa) uses, to the data server (502).

Thereby, as shown in FIG. 19, the data server (502) can manage the cell setting information (congestion control threshold and filter coefficient) and statistical information (time zone, electric power instantaneous value, and number of times of congestion control) corresponding to the radio base station (base station IDa), which the service carrier (carrier IDa) uses, for the unit of its cell (cell ID).

In addition, as shown in FIG. 19, so long as the data server (502) can manage the cell setting information and statistical information corresponding to the radio base station, which the service carrier uses, for the unit of its cell, its acquisition method and management method are not limited in particular, but any methods are applicable.

For example, the communications carrier operates the maintenance terminal (103) to refer to the maintenance server (503), and registers the cell setting information, statistical information, and usage information which relate to the radio base station (105) which the service carrier (carrier IDa) uses, in a folder only for the service carrier (carrier IDa) of the maintenance server (503). Then, the communications carrier operates the maintenance terminal (103) and transmits the purport of registering the information in the folder only for the service carrier, and an access method to the folder to the service carrier's optimization terminal (501). At this time, the communications carrier can also transmit price information in the case of changing a filter coefficient, and information, including a due date for payment etc., to the optimization terminal (501). Then, the service carrier operates the optimization terminal (501) to access the folder only for the service carrier (carrier IDa) of the maintenance server (503). Then, the service carrier downloads the cell setting information, statistical information, and usage information relating to the radio base station (base station IDa), which the service carrier (carrier IDa) uses, to the data server (502).

Thereby, as shown in FIG. 19, the data server (502) can manage the cell setting information and statistical information corresponding to the radio base station (base station IDa), which the service carrier (carrier IDa) uses, for the unit of its cell (cell IDa, IDb). In addition, although the usage information is managed by being related with the base station ID in FIG. 19, when the usage information differs at every cell, it is built so that the usage information may be managed by being related with the cell ID.

Next, the optimization terminal (501) specifies a time zone when congestion control arose on the basis of the cell setting information and statistical information that are managed in the data server (502). Then, on the basis of the information (electric power instantaneous value and congestion control threshold) on the above-mentioned specified time zone, the optimization terminal (501) creates a new instantaneous value graph (304), as shown in FIG. 8 (step S102).

Subsequently, the optimization terminal (501) creates a mean value graph becoming a criterion of judgment for deciding a filter coefficient of the new instantaneous value graph (304) created at step S102 shown in FIG. 17 (step S6).

In this embodiment, as shown in FIG. 11, the data server (502) manages multiple pieces of the mean value graphing information (electric power instantaneous value and filter coefficient) for creating the mean value graph related with mean value graph identification information. Then, the optimization terminal (501) refers to the data server (502), acquires the mean value graphing information (electric power instantaneous value and filter coefficient) shown in FIG. 11 from the data server (502), and creates mean value graphs (301) to (303) shown in FIGS. 12A to 12C on the basis of the acquired mean value graphing information.

Next, as a first phase of filter coefficient selection, the optimization terminal (501) compares the new instantaneous value graph (304), shown in FIG. 8, with the mean value graphs (301) to (303) shown in FIGS. 12A to 12C to specify the mean value graph to which the comparison result corresponds within a predetermined error range (e.g., the error is about 5% or less). Then, the optimization terminal (501) selects a filter coefficient of the specified mean value graph (step S7).

For example, the optimization terminal (501) compares the time mean value of the electric power instantaneous value in the new instantaneous value graph (304) shown in FIG. 8 with the time mean value of the electric power instantaneous value in the mean value graphs (301) to (303) shown in FIGS. 12A to 12C to specify the mean value graph having the time mean value whose value approaches the time mean value of the new instantaneous value graph (304). Then, the optimization terminal (501) selects a filter coefficient in the specified mean value graph.

In this embodiment, the time mean value of the new instantaneous value graph (304) shown in FIG. 8 approaches the time mean value of the mean value graph (302) shown in FIG. 12B. For this reason, the optimization terminal (501) selects the filter coefficient k2 used at the time of calculating the electric power mean value of the mean value graph (302).

Next, the optimization terminal (501) finely tunes the filter coefficient k2, selected in the above-mentioned first phase, as a second phase of filter coefficient selection. In this case, the optimization terminal (501) tunes the filter coefficient k2 finely (k2−Δk) so that the electric power mean value F (n) in the new instantaneous value graph (304) which is calculated using the filter coefficient k2 may approach the congestion control threshold in the new instantaneous value graph (304). Then, the optimization terminal (501) decides the filter coefficient k2−Δk tuned finely as a new filter coefficient (step S8).

Subsequently, the optimization terminal (501) saves the new filter coefficient k2−Δk, decided in the above-mentioned second phase on the basis of a cell ID in the new instantaneous value graph (304), in the maintenance server (503) and data server (502) (step S103).

Thereby, the optimization terminal (501) can update the filter coefficient in the cell setting information, saved in the maintenance server (503) and data server (502), to the new filter coefficient k2−Δk.

In addition, when the setting of the congestion control threshold is changed to be higher than the time mean value in the new instantaneous value graph (304), the optimization terminal (501) saves the congestion control threshold after the setting change in the maintenance server (503) and data server (502).

Thereby, the optimization terminal (501) can update also the congestion control threshold in the cell setting information, saved in the maintenance server (503) and data server (502), to the new congestion control threshold.

Furthermore, the above-mentioned update method of a filter coefficient is not limited in particular, but any methods are applicable. For example, the service carrier operates the optimization terminal (501) to upload the cell ID in the new instantaneous value graph (304), and the new filter coefficient to the exclusive folder in the maintenance server (503). Then, the service carrier operates the optimization terminal (501) to transmit the purport of uploading into the exclusive folder in the maintenance server (503) to the maintenance terminal (103). The communications carrier operates the maintenance terminal (103) to confirm the content of the exclusive folder in the maintenance server (503), and updates the filter coefficient in the cell setting information saved in the maintenance server (503) to the new filter coefficient. In this case, the communications carrier operates the maintenance terminal (103) to transmit the reception content of the purport of receiving the update to the new filter coefficient, to the service carrier's optimization terminal (501). In addition, the communications carrier pays a charge, equivalent to the price information in the case of changing a filter coefficient, to the service carrier.

In addition, when updating the cell setting information managed by the maintenance server (503), the maintenance server (503) judges whether the service carrier fulfills "usage information" of the update object cell, shown in FIG. 18, at the time of the update, and updates the cell setting information when the service carrier fulfills "usage information."

Next, the maintenance server (503) or maintenance terminal (103) specifies a cell ID of the cell, where the filter coefficient is updated, in the cell setting information saved in the maintenance server (503), and creates a change command for changing setting of the filter coefficient of the specified cell ID.

In this case, the maintenance server (503) or maintenance terminal (103) also creates a change command for changing setting of a congestion control threshold when the congestion control threshold is updated. Then, the maintenance server (503) or maintenance terminal (103) transmits the created change commands, which are mentioned above, to the radio network control station (104) (step S10).

In addition, the above-mentioned creation and transmission methods of the change commands are not limited in particular, but any methods are applicable. For example, the maintenance server (503) or maintenance terminal (103) can create the change commands manually, and can also transmit the created change commands to the radio network control station (104). In addition, the maintenance server (503) or maintenance terminal (103) can create the change commands automatically, and can also transmit the created change commands to the radio network control station (104).

When receiving the change commands, the radio network control station (104) changes the cell setting information, which is shown in FIG. 4 and is managed by the radio network control station (104), on the basis of the change commands. Then, the radio network control station (104) uses the filter coefficient k2−Δk after a change to calculate the electric power mean value (mean value of the electric power instantaneous value). Then, the radio network control station (104) judges whether the calculated electric power mean value exceeds the congestion control threshold (step S11).

When judging that the electric power mean value exceeded the congestion control threshold (step S12: Yes), the radio network control station (104) starts the congestion control to the cell (step S13). In this case, the radio network control station (104) transmits the cell ID of the object cell whose congestion control will be started, and a start notice of the congestion control to the radio base station (105).

When receiving the cell ID and start notice of the congestion control, the radio base stations (105) starts communication control of the object cell corresponding to the cell ID, and rejects new connection between the object cell and a radio terminal (107). In addition, the radio base station (105) performs control so as to make communication speed of a radio terminal (107) under communication within the object cell low (step S14). Thereby, when the object cell is congested, the radio base station (10o) can prevent an increase in electric power energy.

In addition, when judging that the electric power mean value of the object cell becomes lower than the congestion control threshold after starting the congestion control at the above step S13 (step S12: No), the radio network control station (104) cancels the congestion control (step S15). In this case, the radio network control station (104) transmits the cell ID of the object cell whose congestion control will be cancelled, and a cancel notice of the congestion control to the radio base station (105).

When receiving the cell ID and cancel notice of the congestion control, the radio base stations (105) cancels the communication control of the object cell corresponding to the cell ID, and permits new connection between the object cell and a radio terminal (107). In addition, the radio base station (105) cancels the control of the communication speed of the radio terminal (107) under communication within the object cell.

Next, the maintenance server (503) or maintenance terminal (103) performs the same processing as those at the above-mentioned steps S3 and S4, acquires statistical information after the filter coefficient change from the radio network control station (104), and manages the acquired statistical information for the unit of its cell in the maintenance server (503) (steps S16 and S17). Then, the maintenance server (503) or maintenance terminal (103) compares the statistical information after the filter coefficient change managed in the maintenance server (503), with the statistical information before the filter coefficient change, and confirms reduction of the number of times of congestion control (step S18).

Moreover, the maintenance server (503) or maintenance terminal (103) can perform control again to change the filter coefficient when the maintenance server (503) or maintenance terminal (103) cannot confirm the reduction of the number of times of congestion control.

For example, the maintenance server (503) or maintenance terminal (103) acquires periodically statistical information after the filter coefficient change from the radio network control station (104), and confirms the number of times of congestion control included in the periodically acquired statistical information. Then, when the maintenance server (503) or maintenance terminal (103) cannot confirm the reduction of the number of times of congestion control, the maintenance server (503) or maintenance terminal (103) judges that congestion control has arisen continuously in the radio network control station (104), and performs control again to change the filter coefficient.

In addition, when the maintenance server (503) or maintenance terminal (103) cannot confirm the reduction of the number of times of congestion control even if repeating the setting change of the filter coefficient of the radio network control station (104) to change the filter coefficient into a predetermined value (e.g., maximum value), the maintenance server (503) or maintenance terminal (103) judges that power capacity of the radio base station (105) reaches a limit value. In this case, the maintenance server (503) or maintenance terminal (103) can also perform control so as to add a radio base station (105). Thereby, it becomes possible to judge correctly whether the power capacity of the radio base stations (105) reaches the limit value to judge correctly necessity of addition of the radio base station (105). In consequence, it becomes possible to reduce a facility investment expense of the radio base stations (105).

<Action and Effect of Radio Communication System of this Embodiment>

In this way, in the radio communication system in this embodiment, a plurality of carriers can perform a setting change of each filter coefficient that is used at the time of calculating an electric power mean value.

Thereby, one carrier does not change settings of filter coefficients in a lump, but a plurality of carriers can change settings dispersedly, and hence, it becomes possible to distribute the processing of the setting changes of filter coefficients. In addition, since it becomes possible to change setting to a filter coefficient according to each carrier, setting to the filter coefficient can be changed so that the filter coefficient responds to various situations. In addition, since each service carrier being able to decide a filter coefficient efficiently can perform a setting change of the filter coefficient, it becomes possible to reduce a facility investment expense of the radio base stations (105). In addition, since a vendor which installs a radio base station (105) also performs a setting change of a filter coefficient, it becomes possible to provide overall service from the installation of a radio base station (105) to the setting change of a filter coefficient for a communications carrier.

(Third Exemplary Embodiment)

Next, a third exemplary embodiment will be described.

In the radio communication system in the first exemplary embodiment, as shown in FIG. 3, the optimization terminal (101) is made to decide a filter coefficient which is used at the time of calculating an electric power mean value (steps S5 to S9).

The radio communication system in the third exemplary embodiment is characterized in that the maintenance terminal (103) or maintenance server (102) performs the processing operations at steps S5 to S9 which are shown in FIG. 3 and are performed by the optimization terminal (101) in the first exemplary embodiment, as shown in FIG. 20.

In this way, in the radio communication system in this embodiment, since the maintenance terminal (103) or maintenance server (102) functions as a coefficient decision apparatus which decides a filter coefficient, it becomes possible to perform the same processing as that in the first exemplary embodiment without providing the optimization terminal (101) shown in FIG. 2 even in system configuration as shown in FIG. 21.

(Fourth Exemplary Embodiment)

Next, a fourth exemplary embodiment will be described.

In the radio communication systems in the first to third exemplary embodiments, the radio base station (105) shown in FIG. 2 measures the electric power instantaneous value of the cell, and transmits the information (time zone and electric power instantaneous value) on the measured electric power instantaneous value to the radio network control station (104). Then, the radio network control station (104) calculates an electric power mean value (value obtained by averaging the electric power instantaneous value) using a filter coefficient, judges whether congestion arose on the basis of the calculated electric power mean value, and performs congestion control according to the decision result.

In this way, in the radio communication systems in the first to third exemplary embodiments, the radio network control station (104) judges whether a congestion arose.

Thus, the radio communication system in the fourth exemplary embodiment is characterized in that the radio network control station (104) does not judge whether a congestion arose, but the radio base station (105) does.

This enables to distribute the processing performed by the radio network control station (104) to reduce a processing load of the radio network control station (104).

In addition, in the radio communication system in the fourth exemplary embodiment, the radio base station (105) judges whether a congestion arose. For this reason, a new filter coefficient decided by the optimization terminal (101), maintenance terminal (103), maintenance server (102), or the like which are high order apparatuses is set in the radio base station (105).

Thereby, the radio base station (105) can perform the congestion control on the basis of the new filter coefficient decided by a high order apparatus (101, 102, 103, or the like) functioning as a coefficient decision apparatus deciding a filter coefficient. In consequence, the radio base station (105) does not judge that a congestion arises just in a state that the new electric power instantaneous value exceeds the congestion control threshold temporarily, and hence, it becomes possible to aim at effective use of power capacity of the radio base station (105). Hereafter, with reference to FIG. 22, the radio communication system in the fourth exemplary embodiment will be described in detail.

As system configuration of the radio communication system in the fourth exemplary embodiment, the same system configurations as those in the above-mentioned first to third exemplary embodiments are applicable. In addition, in the radio communication system in the fourth exemplary embodiment, processing operations between the radio base station (105) and radio network control station (104) are different. For this reason, in this embodiment, processing operations between the radio base station (105) and radio network control station (104) will be described on the basis of the system configuration shown in FIG. 2.

The radio base station (105) in this embodiment manages cell setting information (congestion control threshold and filter coefficient) as shown in FIG. 22. Then, the radio base station (105) measures the electric power instantaneous value of each cell, and calculates the electric power mean value of the measured electric power instantaneous value using a filter coefficient. Then, the radio base station (105) judges whether the electric power mean value exceeds the congestion control threshold, and when judging that the electric power mean value exceeds the congestion control threshold, the radio base station (105) transmits a congestion occurrence notice to the radio network control station (104) to report that the cell (for example, cell IDa) is in a congestion state. The radio network control station (104) starts the congestion control to the cell (cell IDa) when receiving the congestion occurrence notice.

In addition, when judging that the electric power mean value does not exceed the congestion control threshold in the above-mentioned state, the radio base station (105) transmits a congestion cancel notice to the radio network control station (104) to report that the cell (cell IDa) is in a stable state. The radio network control station (104) cancels the congestion control to the cell (cell IDa) when receiving the congestion cancel notice.

Thus, the radio network control station (104) controls start and cancel of the congestion control in the radio communication system in this embodiment on the basis of the congestion occurrence notice and congestion cancel notice.

In this way, in the radio communication system in this embodiment, the new filter coefficient decided by a high order apparatus (101, 102, 103, or the like) functioning as a coefficient decision apparatus deciding a filter coefficient is transmitted to the radio base station (105), and the setting of the cell setting information shown in FIG. 22 managed by the radio base station (105) is changed.

Thereby, the radio base station (105) performs the above-mentioned processing using the new filter coefficient whose setting is changed. In consequence, the radio base station (105) does not judge that a congestion arises just in a state that the electric power instantaneous value exceeds the congestion control threshold temporarily, never transmits the congestion occurrence notice, and hence, it becomes possible to aim at effective use of power capacity of the radio base station (105).

In addition, the embodiments mentioned above are preferable embodiments of the present invention, a scope of the present invention is not limited to the above-mentioned embodiments, but it is possible to construct forms of being corrected or substituted, or being given various modifications by those skilled in the art within a scope of the gist of the present invention.

For example, in the embodiment mentioned above, the new filter coefficient decided by a high order apparatus (101, 102, 103, or the like) functioning as a coefficient decision apparatus deciding a filter coefficient is transmitted to the radio network control station (104), and changes the setting of the cell setting information managed by the radio network control station (104). In addition, in the embodiment, the new filter coefficient decided by the high order apparatus (101, 102, 103, or the like) is transmitted to the radio base station (105), and the setting of the cell setting information managed by the radio base station (105) is changed. However, it is also possible to construct forms so that the radio network control station (104) or radio base station (105) may function as a coefficient decision apparatus which decides a filter coefficient. In this case, the radio network control station (104) first acquires information on the electric power instantaneous value that the radio base station (105) measured. Then, the radio network control station (104) specifies information on the electric power instantaneous value, at which a congestion arises, among from the information on the acquired electric power instantaneous value, selects a filter coefficient according to the information on the specified electric power instantaneous value, and decides the selected filter coefficient as a new filter coefficient. Then, the radio network control station (104) changes setting of the filter coefficient in the cell setting information managed by the radio network control station (104) to the new filter coefficient.

Thereby, the radio network control station (104) changes the setting of the filter coefficient independently, calculates the electric power mean value using the new filter coefficient whose setting is changed, and can judge whether the congestion arose.

In addition, the radio base stations (105) measures the electric power instantaneous value first. Then, the radio base stations (105) specifies information on the electric power instantaneous value, at which a congestion arises, among from the information on the measured electric power instantaneous value, selects a filter coefficient according to the information on the specified electric power instantaneous value, and decides the selected filter coefficient as a new filter coefficient. Then, the radio base station (105) changes setting of the filter coefficient in the cell setting information managed by the radio base station (105) to the new filter coefficient.

Hence, the radio base station (105) changes the setting of the filter coefficient independently, calculates the electric power mean value using the new filter coefficient whose setting is changed, and can judge whether the congestion arose.

In addition, it is also possible to execute the control operations in each apparatus that constructs the radio communication system in this embodiment mentioned above using hardware or software, or composite structure of both.

Furthermore, when the processing is executed using the software, it is possible to install a program of storing a processing sequence in memory in a computer built in dedicated hardware, and to execute the program. Alternatively, it is possible to install a program in a general-purpose computer that can execute various processing and to make the computer execute the program.

For example, it is possible to store the program beforehand in a hard disk or ROM (Read Only Memory) as a recording medium. Alternatively, it is possible to store (record) the program temporary or permanently in a removable recording medium. Such a removable recording medium can be provided as a so-called software package. In addition, as a removable recording medium, a floppy (registered trademark) disk, CD-ROM (Compact Disc-Read Only Memory), MO (Magneto-Optical) disk, DVD (Digital Versatile Disc), magnetic disk, semiconductor memory, or the like is cited.

In addition, the program is installed into a computer from a removable recording medium as mentioned above. In addition, the program is transferred by radio from a download site to a computer. In addition, the program is transferred by wire through a network to a computer.

Furthermore, the radio communication system in this embodiment can be built so that the radio communication system not only executes processing serially according to the processing operations described in the above-mentioned embodiment, but also executes processing parallelly or individually according to processing capacity of an apparatus that executes the processing, or necessity.

Moreover, the radio communication system in this embodiment also can be built so that the radio communication system is logically collective configuration of a plurality of apparatuses, or configuration that apparatuses having each configuration exist in the same housing.

In addition, this embodiment is applicable to an Nth (N is an arbitrary integer) generation communications system, for example, a second or third generation communications system.

What is claimed is:

1. A coefficient decision apparatus comprising:
an acquisition unit that acquires at least a transmission power value; and
a decision unit that specifies a congestion transmission power value, at which a congestion arises, among from the transmission power value acquired by the acquisition unit, selects a filter coefficient according to the congestion transmission power value, and decides the filter coefficient as a new filter coefficient used at the time of averaging the transmission power value,
wherein the transmission power value is a value measured in a predetermined duration; and
wherein the decision unit compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

2. The coefficient decision apparatus according to claim 1, wherein the decision unit specifies an electric power mean value whose value approaches the congestion transmission power value from a managing unit that performs management at least with relating the filter coefficient with an electric power mean value obtained by averaging a transmission power value with the filter coefficient, and selects the filter coefficient, managed by the managing unit with being related with the specified electric power mean value, as the filter coefficient according to the congestion transmission power value.

3. The coefficient decision apparatus according to claim 1, wherein the decision unit adjusts the filter coefficient and decides the adjusted filter coefficient as the new filter coefficient.

4. The coefficient decision apparatus according to claim 3, wherein the decision unit adjusts the filter coefficient so that an electric power mean value obtained by averaging the congestion transmission power value with the adjusted filter coefficient approaches a congestion control threshold becoming a criterion of judgment for specifying the congestion transmission power value.

5. The coefficient decision apparatus according to claim 3, wherein the decision unit adjusts the filter coefficient until an electric power mean value obtained by averaging the congestion transmission power value with the filter coefficient after an adjustment becomes higher than a congestion control threshold and decides the filter coefficient just before becoming higher than the congestion control threshold as the new filter coefficient when the electric power mean value obtained by averaging the congestion transmission power value with the filter coefficient before the adjustment is lower than the congestion control threshold becoming a criterion of judgment for specifying the congestion transmission power value, and adjusts the filter coefficient until an electric power mean value obtained by averaging the congestion transmission power value with the filter coefficient after the adjustment becomes lower than the congestion control threshold and decides the filter coefficient at the time of being lower than the congestion control threshold as the new filter coefficient when the electric power mean value obtained by averaging the congestion transmission power value with the filter coefficient before the adjustment is higher than the congestion control threshold.

6. The coefficient decision apparatus according to claim 1, wherein the acquisition unit acquires at least a transmission power value and the number of times of congestion control that was generated by congestions caused by the transmission power value concerned; and
wherein the decision unit specifies a transmission power value, at which a congestion arises, on the basis of the number of times of congestion control acquired by the acquisition unit, and specifies the congestion transmission power value.

7. The coefficient decision apparatus according to claim 1, wherein the acquisition unit acquires at least a transmission power value and a congestion control threshold that becomes a criterion of judgment for specifying the congestion transmission power value; and
wherein the decision unit compares the transmission power value acquired by the acquisition unit with the congestion control threshold, and specifies a transmission power value that exceeds the congestion control threshold, and specifies the congestion transmission power value.

8. The coefficient decision apparatus according to claim 1, wherein the acquisition unit acquires at least a transmission power value measured in a base station that a carrier uses; and
wherein the decision unit specifies a congestion transmission power value, at which a congestion arises, among from the transmission power value acquired by the acquisition unit, selects the filter coefficient according to the congestion transmission power value and the carrier, and decides the filter coefficient as a new filter coefficient used in the base station.

9. A radio communication system comprising:
an acquisition unit that acquires at least a transmission power value that a base station measures; and
a decision unit that specifies a congestion transmission power value, at which a congestion arises, among from the transmission power value acquired by the acquisition unit, selects a filter coefficient according to the congestion transmission power value, and decides the filter coefficient as a new filter coefficient,
wherein the radio communication system decides whether the congestion arises, on the basis of an electric power mean value averaged with the new filter coefficient decided by the decision unit; and the radio communication system averages a transmission power value, that the base station measures, with the filter coefficient, and performs congestion control of the base station when the radio communication system judges that a congestion arises, on the basis of the electric power mean value obtained by averaging,
wherein the transmission power value is a value measured in a predetermined duration; and
wherein the decision unit compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

10. The radio communication system according to claim 9, further comprising:
a managing unit that performs management at least with relating the filter coefficient with an electric power mean value obtained by averaging a transmission power value with the filter coefficient, wherein the decision unit specifies an electric power mean value, whose value approaches the congestion transmission power value, from in the managing unit, and selects the filter coefficient, managed by the managing unit with being related with the specified electric power mean value, as the filter coefficient according to the congestion transmission power value.

11. A radio communication system comprising:
a controller that averages a transmission power value, which a base station measures, with a filter coefficient, and performs congestion control of the base station when the radio communication system judges that a congestion arises, on the basis of an electric power mean value obtained by averaging; and
a coefficient decision apparatus that decides the filter coefficient,
wherein the coefficient decision apparatus comprises
an acquisition unit that acquires at least a transmission power value that the each the base station measures; and
a decision unit that specifies a congestion transmission power value, at which a congestion arises, among from the transmission power value acquired by the acquisition unit, selects the filter coefficient according to the congestion transmission power value, and decides the filter coefficient as a new filter coefficient; and
wherein the controller decides whether the congestion arises, on the basis of the electric power mean value averaged with the new filter coefficient decided by the decision unit,
wherein the transmission power value is a value measured in a predetermined duration; and
wherein the decision unit compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

12. A radio communication system comprising:
a base station that measures a transmission power value, averages measured values of the transmission power value, with a filter coefficient, and performs congestion control when the base station judges that a congestion arises, on the basis of an averaged electric power mean value; and
a coefficient decision apparatus that decides the filter coefficient,
wherein the coefficient decision apparatus comprises
an acquisition unit that acquires at least a transmission power value that the base station measures; and
a decision unit that specifies a congestion transmission power value, at which a congestion arises, among from the transmission power value acquired by the acquisition unit, selects the filter coefficient according to the congestion transmission power value, and decides the filter coefficient as a new filter coefficient, and
wherein the base station decides whether the congestion arises, on the basis of an electric power mean value averaged with the new filter coefficient decided by the decision unit,
wherein the transmission power value is a value measured in a predetermined duration; and
wherein the decision unit compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

13. A radio communication system comprising:
acquisition means for acquiring at least a transmission power value that a base station measures; and
decision means for specifying a congestion transmission power value, at which a congestion arises, among from the transmission power value acquired by the acquisition means, selecting a filter coefficient according to the congestion transmission power value, and deciding the filter coefficient as a new filter coefficient,
wherein the radio communication system decides whether the congestion arises, on the basis of the electric power mean value averaged with the new filter coefficient decided by the decision means; and the radio communication system averages a transmission power value, that the base station measures, with the filter coefficient, and performs congestion control of the base station when the radio communication system judges that a congestion arises, on the basis of an electric power mean value obtained by averaging, wherein the transmission power value is a value measured in a predetermined duration; and wherein the decision unit compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

14. A radio communication system comprising:

a controller that averages a transmission power value, which a base station measures, with a filter coefficient, and performs congestion control of the base station when the radio communication system judges that a congestion arises, on the basis of an electric power mean value obtained by averaging; and a coefficient decision apparatus that decides the filter coefficient, wherein the coefficient decision apparatus comprises acquisition means for acquiring at least a transmission power value that the each base station measures; and decision means for specifying a congestion transmission power value, at which a congestion arises, among from the transmission power value acquired by the acquisition means, selecting the filter coefficient according to the congestion transmission power value, and deciding the filter coefficient as a new filter coefficient; and wherein the controller decides whether the congestion arises, on the basis of the electric power mean value averaged with the new filter coefficient decided by the decision means, wherein the transmission power value is a value measured in a predetermined duration; and wherein the decision unit compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

15. A radio communication system comprising:

a base station that measures a transmission power value, averages measured values of the transmission power value, with a filter coefficient, and performs congestion control when the base station judges that a congestion arises, on the basis of an averaged electric power mean value; and a coefficient decision apparatus that decides the filter coefficient, wherein the coefficient decision apparatus comprises acquisition means for acquiring at least a transmission power value that the base station measures; and decision means for specifying a congestion transmission power value, at which a congestion arises, among from the transmission power value acquired by the acquisition means, selecting the filter coefficient according to the congestion transmission power value, and deciding the filter coefficient as a new filter coefficient, and wherein the base station decides whether the congestion arises, on the basis of the electric power mean value averaged with the new filter coefficient decided by the decision means, wherein the transmission power value is a value measured in a predetermined duration; and wherein the decision unit compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

16. A coefficient decision method comprising:

an acquisition step of acquiring at least a transmission power value; and a decision step of specifying a congestion transmission power value, at which a congestion arises, among from the transmission power value acquired by the acquisition step, selecting a filter coefficient according to the congestion transmission power value, and deciding the filter coefficient as a new filter coefficient used at the time of averaging the transmission power value, wherein the transmission power value is a value measured in a predetermined duration; and wherein the decision step compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

17. A memory medium storing a coefficient decision program, making a computer execute:

acquisition processing of acquiring at least a transmission power value; and decision processing of specifying a congestion transmission power value, at which a congestion arises, among from the transmission power value acquired by the acquisition processing, selecting a filter coefficient according to the congestion transmission power value, and deciding the filter coefficient as a new filter coefficient used at the time of averaging the transmission power value, wherein the transmission power value is a value measured in a predetermined duration; and wherein the decision processing compares an instantaneous value graph that reproduces the congestion transmission power value in the predetermined duration with at least one mean value graph that becomes a criterion of judgment for deciding the filter coefficient of the instantaneous value graph, specifies a mean value graph to which the comparison result corresponds within a predetermined error range, and selects the filter coefficient, used when creating the specified mean value graph, as the filter coefficient according to the congestion transmission power value.

* * * * *